US012777391B2

(12) United States Patent
Shreevastav et al.

(10) Patent No.: US 12,777,391 B2
(45) Date of Patent: Oct. 27, 2026

(54) WIRELESS DEVICE, FIRST NETWORK NODE, SECOND NETWORK NODE, AND METHODS PERFORMED THEREBY, FOR HANDLING A CARRIER TO MONITOR PAGING

(71) Applicant: Telefonaktiebolaget LM Ericsson (publ), Stockholm (SE)

(72) Inventors: Ritesh Shreevastav, Upplands Väsby (SE); Bela Rathonyi, Lund (SE); Emre Yavuz, Stockholm (SE); Johan Bergman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 405 days.

(21) Appl. No.: 18/026,447

(22) PCT Filed: Oct. 19, 2021

(86) PCT No.: PCT/SE2021/051030
§ 371 (c)(1),
(2) Date: Mar. 15, 2023

(87) PCT Pub. No.: WO2022/086404
PCT Pub. Date: Apr. 28, 2022

(65) Prior Publication Data

US 2024/0397479 A1 Nov. 28, 2024

Related U.S. Application Data

(60) Provisional application No. 63/094,362, filed on Oct. 21, 2020.

(51) Int. Cl.
*H04W 36/30* (2009.01)
*H04W 68/02* (2009.01)

(52) U.S. Cl.
CPC ......... *H04W 36/302* (2023.05); *H04W 68/02* (2013.01)

(58) Field of Classification Search
CPC ............................ H04W 36/302; H04W 68/02
(Continued)

(56) References Cited

U.S. PATENT DOCUMENTS 8,427,976 B1 * 4/2013 Dinan ............... H04W 36/0005 370/252
2003/0095513 A1 * 5/2003 Woodmansee ...... H04W 68/025 370/324
(Continued)

FOREIGN PATENT DOCUMENTS

CN 108307378 A 7/2018
EP 3060019 A1 8/2016
(Continued)

OTHER PUBLICATIONS

Office Action, Japanese Patent Application No. 2023-524170, mailed Apr. 16, 2024, 6 pages.
(Continued)

*Primary Examiner* — Joel Ajayi
(74) *Attorney, Agent, or Firm* — Sage Patent Group

(57) ABSTRACT

A method performed by a wireless device. The method is for handling a carrier to monitor paging. The wireless device operates in a wireless communications network. The wireless device obtains first information. The first information indicates how to determine a carrier to be used to monitor paging based on a change in coverage due to a change in at least one of: a coverage condition and a cell to camp on. The wireless device then determines the carrier to monitor paging based on the obtained first information.

23 Claims, 13 Drawing Sheets

(58) Field of Classification Search
USPC .......................................................... 455/436
See application file for complete search history.

(56) References Cited

U.S. PATENT DOCUMENTS

| | | | | |
|---|---|---|---|---|
| 2009/0215473 | A1* | 8/2009 | Hsu ....................... | H04W 8/183 455/458 |
| 2010/0265913 | A1* | 10/2010 | Gorokhov ......... | H04W 36/0058 370/331 |
| 2019/0313268 | A1* | 10/2019 | Ananda ................. | H04W 68/00 |
| 2020/0154393 | A1 | 5/2020 | Höglund et al. | |
| 2020/0252903 | A1* | 8/2020 | Rico Alvarino ...... | H04L 5/0048 |

FOREIGN PATENT DOCUMENTS

| | | | |
|---|---|---|---|
| EP | 3499930 | A1 | 6/2019 |
| GB | 2552838 | A | 2/2018 |
| WO | 2018065498 | A1 | 4/2018 |

OTHER PUBLICATIONS

International Search Report and Written Opinion of the International Searching Authority, PCT/SE2021/051030, mailed Jan. 31, 2022, 13 pages.

International Preliminary Report on Patentability of the International Preliminary Examining Authority, dated Dec. 9, 2022, PCT/SE2021/051030, 9 pages.

Ericsson, "Non-anchor carrier Paging in NB-IoT," 3GPP TSG-RAN WG2 #95bis, Tdoc R2-166279, Kaohsiung, Taiwan, Oct. 10-14, 2016, 6 pages.

ZTE Corporation et al, "Enhancement on multi carrier configuration and selection," 3GPP TSG-RAN WG2 #111 electronic, R2-2006835, Aug. 17-28, 2020, 9 pages.

Ericsson, "Non-anchor carrier Paging in NB-IoT," 3GPP TSG-RAN WG2 #96, Tdoc R2-167624, Reno, Nevada, USA, Nov. 14-18, 2016, 5 pages.

Huiwei et al, "New WID on Rel-17 enhancements for NB-IoT and LTE-MTC," 3GPP TSG-RAN Meeting #86, RP-193264, Sitges, Spain, Dec. 9-12, 2019, 5 pages.

3GPP TS 36.304 v16.1.0 (Jul. 2020); 3rd Generation Partnership Project; Technical Specification Group Radio Access Network; Evolved Universal Terrestrial Radio Access (E-UTRA); User Equipment (UE) procedures in idle mode (Release 16), 63 pages.

3GPP TS 36.331 v16.1.1 (Jul. 2020); 3rd Generation Partnership Project; Technical Specification Group Radio Access Network; Evolved Universal Terrestrial Radio Access (E-UTRA); Radio Resource Control (RRC); Protocol specification (Release 16), 1078 pages.

3GPP TS 36.413 v16.2.0 (Jul. 2020); 3rd Generation Partnership Project; Technical Specification Group Radio Access Network; Evolved Universal Terrestrial Radio Access Network (E-UTRAN); S1 Application Protocol (S1AP) (Release 16), 424 pages.

3GPP TS 36.321 v16.0.0 (Mar. 2020); 3rd Generation Partnership Project; Technical Specification Group Radio Access Network; Evolved Universal Terrestrial Radio Access (E-UTRA); Medium Access Control (MAC) protocol specification (Release 16), 141 pages.

* cited by examiner a)

b)

a)

b)

a)

b)

WIRELESS DEVICE, FIRST NETWORK NODE, SECOND NETWORK NODE, AND METHODS PERFORMED THEREBY, FOR HANDLING A CARRIER TO MONITOR PAGING

CROSS REFERENCE TO RELATED APPLICATIONS

This application is a 35 U.S.C. § 371 national stage application of PCT International Application No. PCT/SE2021/051030 filed on Oct. 19, 2021, which in turn claims domestic priority to U.S. Provisional Patent Application No. 63/094,362, filed on Oct. 21, 2020, the disclosures and content of which are incorporated by reference herein in their entirety.

TECHNICAL FIELD

The present disclosure relates generally to a wireless device and methods performed thereby for handling a carrier to monitor paging. The present disclosure further relates generally to a first network node, and methods performed thereby for handling the carrier to monitor paging. The present disclosure further relates generally to a second network node, and methods performed thereby for handling the carrier to monitor paging.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., gNB, evolved Node B ("eNB"), "eNodeB", "NodeB", "B node", Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc. . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

A network node may also be a core network node, that is, a node comprised in a core network of the wireless communications network.

The standardization organization 3GPP is currently in the process of specifying a New Radio Interface called NR or 5G-UTRA, as well as a Fifth Generation (5G) Packet Core Network, which may be referred to as Next Generation (NG) Core Network, abbreviated as NG-CN, NGC or 5G CN.

Internet of Things (IoT)

The Internet of Things (IoT) may be understood as an internetworking of communication devices, e.g., physical devices, vehicles, which may also be referred to as "connected devices" and "smart devices", buildings and other items—embedded with electronics, software, sensors, actuators, and network connectivity that may enable these objects to collect and exchange data. The IoT may allow objects to be sensed and/or controlled remotely across an existing network infrastructure.

"Things," in the IoT sense, may refer to a wide variety of devices such as heart monitoring implants, biochip transponders on farm animals, electric clams in coastal waters, automobiles with built-in sensors, DNA analysis devices for environmental/food/pathogen monitoring, or field operation devices that may assist firefighters in search and rescue operations, home automation devices such as the control and automation of lighting, heating, e.g. a "smart" thermostat, ventilation, air conditioning, and appliances such as washer, dryers, ovens, refrigerators or freezers that may use telecommunications for remote monitoring. These devices may collect data with the help of various existing technologies and then autonomously flow the data between other devices.

It is expected that in a near future, the population of IoT devices will be very large. Various predictions exist, among which one assumes that there will be >60000 devices per square kilometer, and another assumes that there will be 1000000 devices per square kilometer. A large fraction of these devices is expected to be stationary, e.g., gas and electricity meters, vending machines, etc.

Machine Type Communication (MTC)

Machine Type Communication (MTC) has in recent years, especially in the context of the Internet of Things (IoT), shown to be a growing segment for cellular technologies. An MTC device may be a communication device, typically a wireless communication device or simply user equipment, that is a self and/or automatically controlled unattended machine and that is typically not associated with an active human user in order to generate data traffic. An MTC device may be typically simpler, and typically associated with a more specific application or purpose, than, and in contrast to, a conventional mobile phone or smart phone.

MTC involves communication in a wireless communication network to and/or from MTC devices, which communication typically may be of quite different nature and with other requirements than communication associated with e.g. conventional mobile phones and smart phones. In the context of and growth of the IoT, it is evident that MTC traffic will be increasing and thus needs to be increasingly supported in wireless communication systems.

Narrowband Internet of Things (NB-IoT)

Narrowband Internet of Things (NB-IoT) may be understood as a Low Power Wide Area Network (LPWAN) radio technology standard developed by 3GPP to enable a wide range of cellular devices and services. NB-IoT may be understood to focus on indoor coverage, low cost, long battery life, and high connection density.

For NB-IoT, different coverage enhancement techniques have been defined to support use cases which may require radio reception in poor coverage. One such technique may be the use of repetitions when transmitting data and/or messages on different radio channels. The terminology Coverage Enhancement (CE) level may be commonly used in the literature to describe the coverage of an NB-IoT UE in IDLE mode and may be as specified by 3GPP in, e.g., 36.321, v. 16.0.0, section 5.1.1. The UE may be typically said to be in a specific CE level based on its Narrowband Reference Signal Received Power (NRSRP) measurements that may be compared with thresholds broadcasted by the eNB in the NB-IoT cell. There may be up to 3 CE levels per cell: denoted CE level 0 to CE level 2. CE level 0 may be understood to correspond to normal/good coverage, and CE level 2 to the worst case, where the coverage may be assumed to be very poor. One aspect of the different CE levels may be understood to be that the data and/or message transmissions on various radio channels may have to be repeated several times, especially for the higher CE levels 1-2, in order to be successfully received by UEs and/or eNBs.

At the RAN plenary meeting #86 on Dec. 9-12, 2019, a new Work Item (WI) entitled "Rel-17 enhancements for NB-IoT and LTE-MTC" was agreed, see RP-193264. One of its objectives consists in specifying the introduction of NB-IoT carrier selection based on the coverage level as stated in the Work Item Description (WID): "Introduce support for NB-IoT carrier selection based on the coverage level, and associated carrier specific configuration (e.g. maximum repetitions UL/DL, DRX configurations, etc.). [NB-IoT] [RAN2, RAN3]"

In Rel-13, Random Access (RA) and Paging may be only in the anchor carrier.

Multicarrier operation in NB-IoT has been supported since Rel-14. In Rel-14, multi-Physical Resource Block (PRB) operation may be enhanced such that UEs may both perform Random Access (RA) and monitoring of paging on non-anchor carriers. This may provide a capacity increase both for Random Access and Paging transmissions. The NW may configure and provide which carriers the UE may be required to use for paging in SIB22-NB. Non-anchor carrier configurations for RA and paging may be provided in a new System Information Block (SIB) SIB22-NB since they may be understood to need to be known to UEs in Radio Resource Control (RRC) Idle mode. Maximum number for paging and Random Access Channel (RACH) carriers may be maxNonAnchorCarriers-NB-r14+1, which may equal to 16.

For Paging as specified in 36.304, v16.0.0, the paging related parameters and static parameter such as the UE identity (UE_ID) may be used for selecting a paging carrier. For example, as stated in TS 36.304, v16.0.0, if a Paging-Radio Network Temporary Identifier (P-RNTI) is monitored on Narrowband Physical Downlink Control Channel (NPDCCH) and the UE supports paging on a non-anchor carrier, and if paging configuration for non-anchor carrier is provided in system information, then the paging carrier may be determined by the paging carrier with smallest index n (0≤n≤Nn−1) fulfilling the following equation:

$$\text{floor}(\text{UE\_ID}/(N*Ns)) \bmod W < W(0)+W(1)+\ldots+W(n)$$

Thus, paging carrier as such may be understood to be deterministic from the network and the UE perspective as it may involve a static attribute such as UE_ID and paging carrier weights.

That a paging carrier is deterministic may be understood to mean there is no ambiguity between the network and a UE. The network may be understood to be aware of where the UE may be listening for paging and the UE may be aware where the network may be expecting the UE to listen for paging.

Existing methods for paging use resources inefficiently, and may result in unnecessary waste of both, capacity and power consumption.

SUMMARY

As part of the development of embodiments herein, one or more challenges with the existing technology will first be identified and discussed.

Rel-14 may allow NB-IoT UE monitoring of paging on a non-anchor carrier, but the non-anchor paging carrier may need to be used by all NB-IoT UEs, regardless of coverage condition, camped on the cell. If the maximum number of repetitions for paging, or paging Rmax, for NPDCCH is very large, the UEs in good coverage may experience large delays due to paging transmissions to UEs in poor coverage. A UE in good coverage may need to wait for a large number of paging NPDCCH repetitions to finish before starting to decode the paging message transmitted on the Narrowband Physical Downlink Shared Channel (NPDSCH).

Moreover, in order to avoid paging occasion (PO) overlap, paging parameters in SIB22-NB may need to be set properly. Since the paging carrier may be used for all NB-IoT UEs regardless of coverage conditions, Rmax for this paging carrier may usually be large in order to cover UEs in poor coverage, which may be understood to mean that there may usually be a large timing difference between Paging Occasions (POs). Thus, it may further introduce paging delays for UEs in good coverage.

Another problem with the current solution may be understood to be that all paging carriers in a NB-IoT cell may typically need to be configured so that all UEs in a cell may be paged successfully to the coverage limit. In many cases certain carriers may be more suitable to be used for transmitting paging to UEs in poor coverage compared to other carriers due to, for example, a power difference or different interference levels. An anchor carrier may provide the Narrowband Primary Synchronization Signal (NPSS) and Narrowband Secondary Synchronization Signal (NSSS), whereas both anchor and non-anchor may be used for paging and random access. An Anchor carrier may be power boosted compared to a non-anchor carrier, as it may also carry synchronization signal which may need to be used by a UE also camped on a non-anchor carrier. Because of power boosting, the coverage of the anchor carrier as such may be larger than the one of the non-anchor carrier. As a simple example, an NB-IoT cell with 2 carriers may be considered, where one of the carriers, typically the anchor carrier, may be power boosted and may thus have 6 dB higher power than the non-anchor carrier. If it is assumed that X repetitions are needed on the NPDCCH to reach a 1% Block Error Rate (BLER) on the anchor carrier for a paging message then 4*X repetitions would be needed to achieve the same decoding performance when the non-anchor carrier is used, assuming that each doubling of repetitions achieve a 3 dB gain. This may be understood to imply that the Rmax on the non-anchor carrier may typically need to be set four times larger compared to the value used on the anchor carrier to be able to sustain a certain max coverage of a cell, e.g., Maximum Coupling Loss (MCL) equal to 164 dB if max coverage enhancement is used in the cell. This may result in that when poor coverage UEs are paged on the non-anchor carrier compared to on the anchor carrier, more radio resources are wasted, and the UE power consumption is larger, due to the fact that its receiver may need to be turned on during a longer time duration and more amount of data may need to be accumulated/combined in the decoding process for a successful reception.

Due to the above, both unnecessary capacity and power consumption is wasted as a result of only using the static UE identity for selecting/determining the paging carrier used in an NB-IoT cell.

In 3GPP/RAN2, various discussions have been held on how the coverage condition of the UE may be used in the paging carrier selection. There are various problems related to having the carrier selection based only on the UE coverage measurements, refer to for example R2-166279, section 2.4. One solution to this, see R2-2006835 may be that the UE informs the network (NW) if it has changed CE level or selected a new carrier; however, this may lead to excessive signaling and UE power consumption and may be understood to thus not be a good solution.

Another solution being discussed is to have the paging carrier selection done by the UE based on the static UE identity but let the NW control the used paging carrier based on dynamic information such as coverage level and/or additional information such as load, see PCT/EP2017/075268, R2-166279, section 2.4, and R2-167624, section 2.3.

The latter approach lacks some detailed aspects on how to get a robust paging operation working in a NB-IoT system when, for example, the UE coverage level may change, or the UE may move out and/or in of coverage of a cell. Thus, additional rules and mechanisms may be needed so that paging may be done efficiently to meet both static and dynamic based criteria.

It is an object of embodiments herein to improve the handling of a carrier to monitor paging.

According to a first aspect of embodiments herein, the object is achieved by a method, performed by a wireless device. The method is for handling a carrier to monitor paging. The wireless device operates in a wireless communications network. The wireless device obtains first information. The first information indicates how to determine a carrier to be used to monitor paging based on a change in coverage. The change in coverage is due to a change in at least one of: a coverage condition and a cell to camp on. The wireless device also determines the carrier to monitor paging based on the obtained first information.

According to a second aspect of embodiments herein, the object is achieved by a method, performed by a first network node. The method is for handling a carrier to monitor paging. The first network node operates in the wireless communications network. The first network node sends the first information. The first information indicates, to the wireless device operating in the communications network, how to determine the carrier to be used to monitor paging based on the change in coverage. The change in coverage is due to a change, for the wireless device, in at least one of: the coverage condition and the cell to camp on.

According to a third aspect of embodiments herein, the object is achieved by a method, performed by the second network node. The method is for handling a carrier to monitor paging. The second network node operates in the wireless communications network. The second network node obtain a first indication indicating a capability of the wireless device operating in the wireless communications network. The capability is to support a change of paging carrier based on a change in coverage. The change in coverage is due to a change in at least one of: the coverage condition and the cell to camp on. The second network node also sends the second indication to one of the first network node, or another network node. The second indication indicates the indicated capability.

According to a fourth aspect of embodiments herein, the object is achieved by the wireless device, for handling the carrier to monitor paging. The wireless device is configured to operate in the wireless communications network. The wireless device is further configured to obtain the first information configured to indicate how to determine the carrier configured to be used to monitor paging based on the change in coverage due to the change in at least one of: the coverage condition and the cell to camp on. The wireless device is further configured to determine the carrier to monitor paging based on the first information configured to be obtained.

According to a fifth aspect of embodiments herein, the object is achieved by the first network node, for handling the carrier to monitor paging. The first network node is configured to operate in the wireless communications network. The first network node is further configured to send the first information. The first information is configured to indicate, to the wireless device configured to operate in the communications network, how to determine a carrier. The carrier is to be used to monitor paging based on a change in coverage. The change in coverage is due to a change, for the wireless device, in at least one of: the coverage condition and the cell to camp on.

According to a sixth aspect of embodiments herein, the object is achieved by the second network node, for handling the carrier to monitor paging. The second network node is configured to operate in the wireless communications network. The second network node is further configured to obtain the first indication configured to indicate the capability of the wireless device configured to operate in the wireless communications network. The capability is configured to be to support a change of paging carrier based on a change in coverage. The change in coverage is configured to be due to a change in at least one of: the coverage condition and the cell to camp on. The second network node is further configured to send the second indication to one of a first network node, or another network node. The second indication is configured to indicate the capability configured to be indicated.

By the first network node sending and the wireless device obtaining the first information, the wireless device may be enabled to then know how to determine the carrier to be used to monitor paging whenever a change in coverage may happen due to a change in the coverage condition or the cell to camp on.

By determining the carrier to monitor based on the first information, the wireless device may be configured to flexibly select the carrier to be used for paging based on coverage levels, so that, for example, if the wireless device is in good coverage, the wireless device may be configured to monitor paging on a carrier configured with relatively less NPDCCH repetitions required to decode the message, whereas if the wireless device is in poor coverage, it may be configured to monitor paging on a power boosted carrier or a carrier configured with relatively more NPDCCH repetitions required to decode the message. Hence, the number of repetitions that may be required to decode the paging control channel, NPDCCH, and paging message, NPDSCH, may be less, and thus power consumption by the wireless device during paging may be thereby reduced.

Accordingly, paging delay may be reduced and paging may be deterministic. That is, there may be as a result be no ambiguity between the first network node and wireless device in terms of where to page and where to monitor for paging respectively; since the wireless device may obtain the rules on how to determine the carrier ahead of the time, the change may take place, so that the wireless device may not be required to inquire about what carrier to use whenever a change in coverage may occur, and when potentially the coverage may be poor.

Furthermore, specific paging carrier configuration may be understood to be helpful for capacity increase and paging load control since paging in non-anchor carrier(s) may alleviate the reliance upon e.g., an anchor carrier, and may free up resources in the anchor carrier and further provide a means to handle increased paging load, if any.

For example, for an NB-IoT cell with the anchor carrier being power-boosted, by for example 6 dB, and non-anchor carriers not being power-boosted, which may be understood to be a typical deployment today, all, or a very large part, of the good coverage UEs may be configured to be monitoring paging on the non-anchor carriers and the poor coverage UEs may be configured to monitor paging on the anchor carrier. This coverage level-based paging approach may be understood to save both UE power and spectrum resources, as less radio resources may be needed to page the poor coverage UEs since the number of repetitions may be understood to be less, and for example, for UEs which may be in good coverage, then paging multiplexing to multiple UEs on the non-anchor carrier may be performed, which may be more efficient.

By obtaining the first indication, the second network node may be enabled to know whether or not the wireless device may support a change of paging carrier based on a change in coverage due to a change in coverage condition or cell to camp on. By then sending the second indication indicating the capability to the first network node or the another network node, the recipients may be enabled to know whether or not the wireless device may support a change of paging carrier based on a change in coverage due to a change in coverage condition or cell to camp on and instruct the wireless device accordingly.

BRIEF DESCRIPTION OF THE DRAWINGS

Examples of embodiments herein are described in more detail with reference to the accompanying drawings, according to the following description.

DETAILED DESCRIPTION

Certain aspects of the present disclosure and their embodiments may provide solutions to these or other challenges. Embodiments herein may be generally understood to relate to different aspects of providing methods for deterministic paging whilst considering dynamic attributes, such as coverage condition. Embodiments herein may be understood to provide mechanisms to improve the flexibility to configure paging resources based on paging carrier characteristics, e.g. power boosting level, and the coverage situation of a UE.

With the existing methods, paging may be provided only by means of static parameters, such as UE ID and preconfigured/known paging parameters. With the new mechanisms, the NW may configure the paging carrier with regards to dynamic attributes, such as based upon prevailing NRSRP, and rules in the UE for how to act upon coverage, e.g., NRSRP, changes when moving out of coverage of a configured paging carrier. The legacy paging mechanism may be also termed as static. The new mechanism defined according to embodiments herein may be termed as dynamic or coverage condition-based paging.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Figure 1:
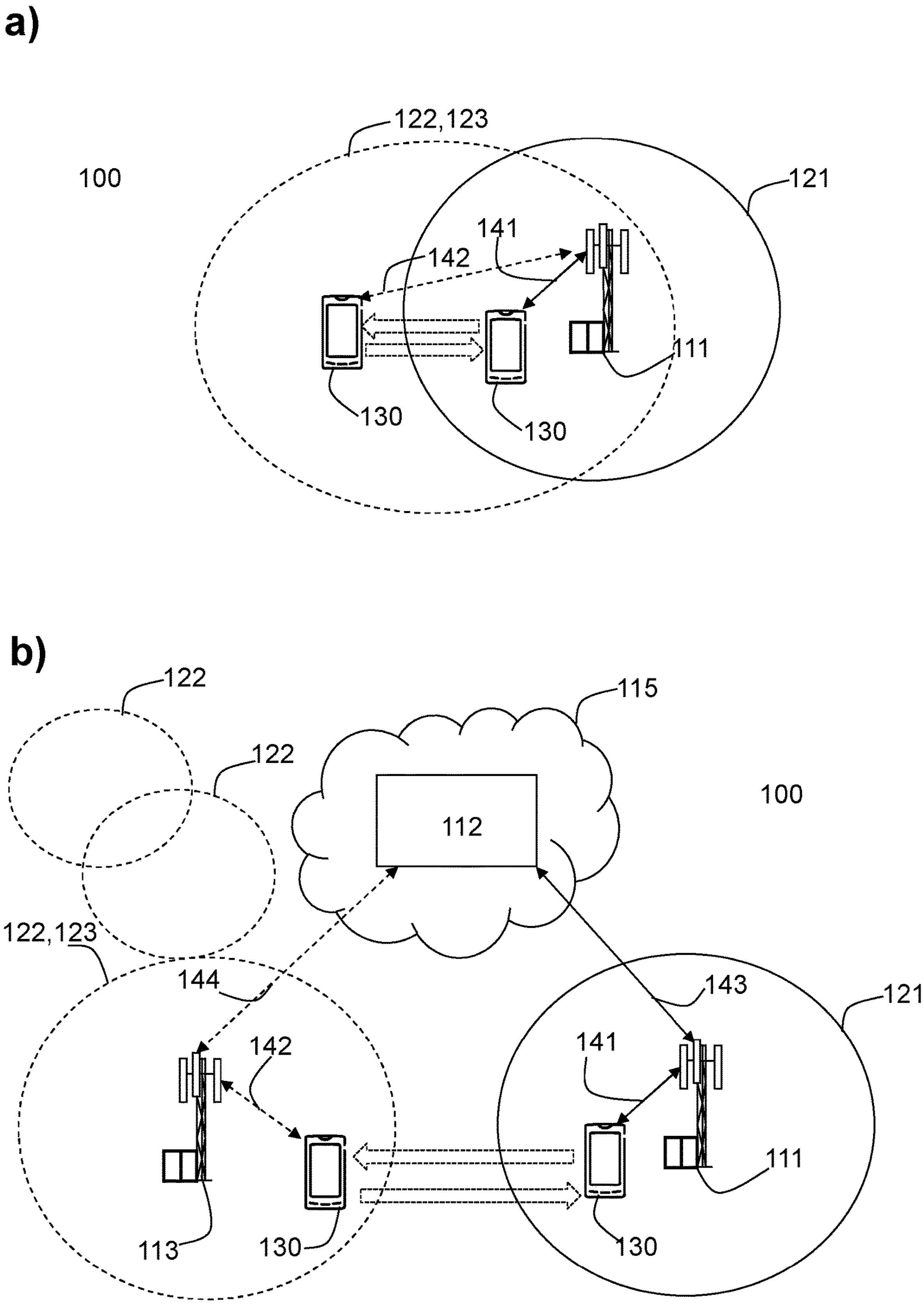
FIG. 1 is a schematic diagram depicting an example of a wireless communications network, according to embodiments herein.

FIG. 1 depicts two non-limiting examples, in a panel a), and panel b), respectively, of a wireless network or wireless communications network 100, sometimes also referred to as a wireless communications system, cellular radio system, or cellular network, in which embodiments herein may be implemented. The wireless communications network 100 may typically be or support MTC, eMTC, IoT and/or NB-IoT. The wireless communications network 100 may be a 5G system, 5G network, or Next Gen System or network, or a younger system with similar functionality. In other examples, the wireless communications network 100 may instead, or in addition, support other technologies such as, for example, Long-Term Evolution (LTE), e.g. LTE-M, LTE Frequency Division Duplex (FDD), LTE Time Division Duplex (TDD), LTE Half-Duplex Frequency Division Duplex (HD-FDD), LTE operating in an unlicensed band, such as LTE LAA, eLAA, feLAA and/or MulteFire. Yet in other examples, the wireless communications network 100 may support other technologies such as, for example Wideband Code Division Multiple Access (WCDMA), Universal Terrestrial Radio Access (UTRA) TDD, Global System for Mobile communications (GSM) network, GSM/Enhanced Data Rates for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system.

The wireless communications network 100 may comprise a plurality of network nodes, whereof a first network node 111, is depicted in the non-limiting examples of panels a) and b) in FIG. 1. In some non-limiting examples, such as that in panel b) of FIG. 1, the wireless communications network 100 may further comprise second network node 112 and/or another network node 113. Any of the first network node 111 and the another network node 113 may be a radio network node. That is, a transmission point such as a radio base station, for example a gNB, an ng-NB, an eNB, an eNodeB, or a Home Node B, a Home eNode B, or any other network node with similar features capable of serving a user equipment, such as a wireless device or a machine type communication device, in the wireless communications network 100. In some examples, any of the first network node 111 and the another network node 113 may be a distributed node and may partially perform its functions in collaboration with a respective virtual node in a cloud 115. In typical examples, the first network node 111 may be a different node than the another network node 113.

The second network node 112 may be a core network node having a capability to manage mobility for a wireless device such as the wireless device 130 described below. For example, the second network node 112 may have a capability to manage paging, e.g., paging events, such as having a capability to send paging requests. The second network node 112 may be, for example, a Mobility Management Entity (MME).

The wireless communications network 100 may cover a geographical area, which in some embodiments may be divided into cell areas, wherein each cell area may be served by a radio network node, although, one radio network node may serve one or several cells. The wireless communications network 100 may comprise a first cell 121, as depicted in panel a). In some embodiments, the wireless communications network 100 may further comprise one or more other cells 122. The one or more other cells 122 may comprise another cell 123, which may be referred to as a new cell. In panel a) only the another cell 123 is depicted as being comprised in the one or more cells 122. In panel b), three cells are depicted as being comprised in the one or more cells 122. This may be understood to be for illustrative purposes. It may be understood that any number of cells may be comprised in the one or more other cells 122. In the non-limiting example of FIG. 1, the first network node 111 serves the first cell 121, which may be also referred to as a serving cell or a current cell. The one or more other cells 122, such as the another cell 123, may be served also by the first network node 111 as in the non-limiting example of FIG. 1*a*), or may be served by the another network node 113 in the non-limiting example of FIG. 1*b*), or each may be served respectively by a respective another network node 113, which is not depicted to simplify FIG. 1. Any of the first network node 111 and the another network node 113 may be of different classes, such as, e.g., macro eNodeB, home eNodeB or pico base station, based on transmission power and thereby also cell size. In some examples, any of the first cell 121 and the one or more other cells 122 may be beams, that is, any of the first network node 111 and the another network node 113 may serve receiving nodes with serving beams. Any of the first network node 111 and the another network node 113 may support one or several communication technologies, and its name may depend on the technology and terminology used. Any of t the first network node 111 and the another network node 113 may be directly connected to one or more core networks.

A plurality of wireless devices may be located in the wireless communication network 100, whereof a wireless device 130, is depicted in the non-limiting examples of FIG. 1. The wireless device 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, a sensor, IoT device, MTC device, NB-IoT device, device equipped with a wireless interface, such as a printer or a file storage device, modem, or any other radio network unit capable of communicating over a radio link in a communications system. The wireless device 130 comprised in the wireless communications network 100 may be enabled to communicate wirelessly in the wireless communications network 100. The communication may be performed e.g., via a RAN, and possibly the one or more core networks, which may be comprised within the wireless communications network 100.

The wireless device 130 may be configured to communicate within the wireless communications network 100 in the first cell 121 with the first network node 111 over a first link 141, e.g., a radio link. The wireless device 130 may be configured to communicate within the wireless communications network 100 in the one or more other cells 122, respectively, over a respective second link 142, e.g., a radio link. The second link 142 may be understood to be between the wireless device 130 and the respective another network node 113 serving, respectively, one or more other cells 122, e.g., the first network node 111, as depicted in panel a), or the another node 113, as depicted in panel b). The first network node 111 may be configured to communicate within the wireless communications network 100 with the second network node 112 over a third link 143, e.g., a radio link or a wired link. The second network node 112 may be configured to communicate within the wireless communications network 100 with the another network node 113 over a fourth link 144, e.g., a radio link or a wired link. The wireless device 130 may move in the direction of the thick dashed arrows.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", and/or "fifth", etc. . . . herein may be understood to be an arbitrary way to denote different elements or entities and may be understood to not confer a cumulative or chronological character to the nouns they modify, unless otherwise noted, based on context.

Some embodiments herein will now be further described with some non-limiting examples.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

In the following description, any reference to a/the UE, or simply "UE" may be understood to equally refer the wireless device 130; any reference to a/the gNB, may be understood to equally refer to the first network node 111 or the another network node 113, based on context; any reference to a/the gNB, a/the NW and/or a/the network may be understood to equally refer to the first network node 111, the another network node 113 or the second network node 112, based on context.

In the section below, the embodiments disclosed herein are elaborated and illustrated focusing to support deterministic paging.

More specifically, the following are embodiments related to a wireless device, such as the wireless device 130, e.g., a 5G UE or a UE, embodiments related to a first network node, such as the first network node 111, e.g., a gNB, and embodiments related to a second network node, such as the second network node 112, e.g., an MME.

Embodiments of a method, performed by the wireless device 130, will now be described with reference to the flowchart depicted in FIG. 2. The method may be understood to be for handling a carrier to monitor paging. The wireless device 130 operates in the wireless communications network 100.

In some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

The method may be understood to be a computer-implemented method.

The method may comprise some of the following actions. In some embodiments, all the actions may be performed. One or more embodiments may be combined, where applicable. Components from one embodiment may be tacitly assumed to be present in another embodiment and it will be obvious to a person skilled in the art how those components may be used in the other exemplary embodiments. All possible combinations are not described to simplify the description. A non-limiting example of the method performed by the wireless device 130 is depicted in FIG. 2. In FIG. 2, optional actions in some embodiments may be represented with dashed lines.

Action 201

In the course of operations in the wireless communications network 100, the wireless device 130 may experience a change in coverage, e.g., due to mobility. In some examples, the wireless device 130 may be configured with a specific paging carrier, e.g., as described in PCT/EP2017/075268 during CONNECTED mode, or in the transition from IDLE mode to CONNECTED mode, e.g., as part of Msg4. Hereafter, this carrier may be referred to as a/the dedicated paging carrier. It may be also assumed that the dedicated paging carrier may be valid in the wireless device 130 until the next time the wireless device 130 may enter CONNECTED mode.

Some mechanisms may be needed for how the wireless device 130 may need to behave in IDLE mode when the coverage situation may change after a dedicated paging carrier may have been configured. There may be two basic scenarios. In a first scenario, the coverage becomes worse, so the wireless device 130 may camp on a new cell based on re-selection criteria of the cell. In a second scenario, the coverage becomes worse so the paging reception performance on the dedicated paging carrier, based on some criteria, may become poor, but the wireless device 130 may still camp on the same cell based on the re-selection criteria of the cell.

These two scenarios are described in some more detail below.

According to the first scenario, Scenario 1, the wireless device 130 may be camping on a cell, e.g., the first cell 121, and based on its identifier, e.g., its UE_ID, the wireless device 130 may monitor paging on Carrier 1. When entering CONNECTED mode, the NW may identify that the wireless device 130 may need to be moved to a dedicated paging carrier to monitor paging that is different from Carrier 1. The NW may instruct the wireless device 130 to monitor paging on the dedicated paging carrier. The wireless device 130 may monitor paging accordingly. The wireless device 130 may re-select a new cell based on the configured cell re-selection criteria. One open question in this scenario is what paging carrier the wireless device 130 may need to use to monitor paging on.

According to the second scenario, Scenario 2, the steps in this are the same as Scenario 1 except for the last step where the coverage situation becomes worse but no new cell is selected. The same question as for the previous scenario applies here as well.

One solution to the above open questions may be that a radio network node such, e.g., an eNB, may instruct the wireless device 130, through signalling, where to monitor paging after the coverage situation changes, such as in Scenario 2, e.g., based on reaching a certain Narrowband Reference Signal Received Power (NRSRP) threshold or estimated NPDCCH BLER becoming larger than a certain percentage value, for example, 1%, or in the case of camping on a new cell, such as in Scenario 1, by one of the following options: 1) the anchor carrier or, 2) using the legacy procedure (based on UE_ID) or, 3) the dedicated paging carrier from the previous cell.

The "option 3" may be beneficial to have in case all cells belonging to the same tracking area (TA) or the same radio network node, e.g., eNB, may have the exact same paging carrier configurations. Applying the same paging configuration in the whole NW, e.g., in all Tracking Areas (TAs), may also be considered but when a wireless device 130 moves into a new TA it may anyway connect to the NW in order to be paged, through a Tracking Area Update (TAU), so then a dedicated paging carrier may be configured again.

In this Action 201, the wireless device 130 may send a first indication to the first network node 111. The first indication may indicate a capability of the wireless device 130. The capability may be to support a change of paging carrier based on a change in coverage due to a change in at least one of: a coverage condition and a cell to camp on.

The sending in this Action 201 may be, e.g., transmitting.

The sending in this Action 201 to the first network node 111 may be, e.g., via the first link 141.

By sending the first indication to the first network node 111 in this Action 201, the wireless device 130 may enable the first network node 111 to know whether or not the wireless device 130 may support a change of paging carrier based on a change in coverage due to a change in coverage condition or cell to camp on and instruct the wireless device 130 accordingly in the next Action 202, and to identify on which carrier to send the page; that is, where the wireless device 130 may be monitoring the paging.

Action 202

In this Action 202, the wireless device 130 obtains first information. The first information indicates how to determine a carrier to be used to monitor paging. The first information indicates how to determine the carrier to be used to monitor paging based on a change, e.g., by the wireless device 130, in coverage due to a change in at least one of: the coverage condition and the cell to camp on. For example, what the wireless device 130 may need to do if it moves away from the cell where it was assigned a new paging carrier or if its coverage condition changed significantly with respect to the assigned paging carrier so it may no longer be possible to receive paging on.

How to determine may be understood to mean for the wireless device 130 how to determine.

Obtaining may comprise, receiving or retrieving. In some embodiments, the first information may be received from the first network node 111 operating in the wireless communications network 100, e.g., via the first link 141.

The first information may comprise e.g., one or more rules, and one or more thresholds, such as a first threshold and a second threshold described below.

The coverage condition may be determined based on a measure of radio coverage estimated by the wireless device 130. The measure or radio coverage may be, e.g., e.g., an error rate, such as e.g., BLER, in a control channel, such as e.g., the NPDCCH. The coverage condition may be determined based on a measure of radio coverage, e.g., estimated by the wireless device 130, e.g., using a maximum number of repetitions, on e.g., a first carrier, such as a dedicated paging carrier. Another example of the measure of radio coverage may be, e.g., measured NRSRP, or Signal to Interference Noise Ratio (SINR), etc. . . .

The coverage condition may be determined based on a measure of radio coverage for a given coverage level, e.g., a given number of repetitions.

The coverage condition may exclude coverage level.

That is, the coverage condition may be understood to refer to a condition of a radio channel, separate from, or independent from a number of repetitions.

The change in cell to camp on may be understood to refer to the fact that the wireless device 130 may be in the first cell 121, and it may then move out of the coverage of the first cell 121, and into the coverage of the one or more other cells 122, e.g., the another cell 123. In some examples, the wireless device 130 may then move back into the coverage of the first cell 122.

In some examples, the change in coverage may comprise one or more transitions from connected state to idle state, or a from idle state to connected state.

The first information may indicate to use one of: an anchor carrier, a fixed carrier, e.g., a carrier derived based on an identifier of the wireless device 130, and a first carrier assigned as dedicated paging carrier via dedicated signalling.

The obtained first information may be based on the sent first indication.

In some examples, the obtained first information may indicate that at least one of the following options may apply. According to one option, with the proviso that a measure of the coverage condition indicates poor coverage with respect to a first threshold, the wireless device 130 is to select a fourth carrier, e.g., an anchor carrier or another carrier different than the dedicated paging carrier. According to another option, with the proviso that the measure of the coverage condition indicates good coverage with respect to a second threshold, the wireless device 130 is to select a fifth carrier, e.g., the first carrier, such as the dedicated paging carrier. For example, for Scenario 2 some mechanisms and/or rules may need to be clearly defined for how the wireless device 130 may need to monitor a changed coverage situation. One preferred approach may be that the wireless device 130 estimates the NPDCCH BLER for a Paging Downlink Control Information (DCI), using Rmax on the dedicated paging carrier. As long as this estimated BLER is less than a threshold, that either may be hardcoded, e.g., 1%, or signaled to the wireless device 130, the dedicated paging carrier may be required to be used. The estimated BLER may need to preferably be based on internal measurements of the wireless device 130, e.g. NRSRP and/or SINR, and may be based on the same and/or similar criteria as already used for the Msg3 Channel Quality Information (CQI) reporting for NB-IoT. When the estimated BLER may become larger than the threshold, another carrier may be required to be selected. This other carrier may then either be the anchor carrier of the cell or yet another paging carrier provided by the eNB through signaling, either dedicated as part of configuring the dedicated paging carrier or through System Information (SI) broadcast, e.g. SIB22-NB.

After having moved away from the dedicated paging carrier, e.g., based on the estimated BLER exceeding a threshold, the wireless device 130 may need to, as long as it may be camping on the same cell, evaluate if the coverage situation improves, and when the estimated BLER for the dedicated paging carrier may go below the same threshold, or the second threshold, it may be required to go back and monitor paging on that dedicated paging carrier.

The obtained first information may indicate at least one of the following options. According to a first option, with the proviso that the wireless device 130 enters idle mode, the wireless device 130 may be required to use the first carrier assigned as dedicated paging carrier via dedicated signalling, and continue to apply the obtained first information until the wireless device 130 enters connected state, also referred to as connected mode, next time. For example, as long as the wireless device 130 is camping on the cell where it was assigned a paging carrier and its coverage level has not changed or is better, the wireless device 130 may monitor paging using the assigned paging carrier provided before it was released to idle mode. According to a second option, with the proviso that the wireless device 130 camps on another cell 123, and with the proviso that second information on how to select the carrier to be used for paging is provided, e.g., broadcasted, in the another cell 123, the wireless device 130 may be required to determine the carrier to be used based on the second information. Second information may be understood to be equivalent to the first information, but provided in the another cell 123. According to a third option, with the proviso that; a) the wireless device 130 camps on another cell 123, b) the second information on how to select the carrier to be used for paging is absent, e.g., in broadcasts, in the another cell 123, and c) the first information indicates a fallback configuration, e.g., a second carrier, the wireless device 130 may be required to determine the carrier to be used based on the fallback configuration indicated, e.g., the second carrier, in the first information. According to a fourth option, with the proviso that: a) the wireless device 130 camps on another cell 123, b) the second information on how to select the carrier to be used for paging is absent, e.g., in broadcasts, in the another cell 123, and c) the first information lacks an indication of the fallback configuration, e.g., the second carrier, the wireless device 130 may be required to determine the carrier to be used based on a third carrier, e.g., a fixed carrier, such as a carrier derived based on an identifier of the wireless device 130.

Another scenario that may need clear rules may be what may need to happen if the wireless device 130 makes a cell re-selection and then comes back to the original cell where a dedicated paging carrier was configured without having been in CONNECTED mode in any other cell. In this scenario, the preferred approach may be that the wireless device 130 may continue to use the dedicated paging carrier in the same way as last time it was camping on the cell, that is, when it received the configuration for the dedicated paging carrier. In accordance with this, and according to a fifth option, with the proviso that: a) the wireless device 130 receives the first information in the first cell 121, camps on one or more other cells 122 without being in connected mode, and then re-selects the first cell 121, the wireless device 130 may be required to determine the carrier to be used based on the first information, e.g., based on the first carrier assigned as dedicated paging carrier via dedicated signalling.

As part of the above rules and/or criteria, some hysteresis, e.g., time, may need to preferably also be applied to avoid the wireless device 130 jumping between paging carriers too fast. One example of such hysteresis may be that the wireless device 130 may only be allowed to change carrier at most every X paging occasion, X may be predefined or signaled. Another example may be to have, as mentioned above, separate thresholds, e.g., Y % BLER for moving away from the dedicated paging carrier, and Z % for moving back.

Signaling to Indicate Dedicated Paging Carrier

In some embodiments, at least one of the following may apply. In some embodiments, the first information may be received in dedicated signalling or in broadcasted information, e.g., SIB2-NB or SIB22-NB, in the first cell 121. In some embodiments, the second information may be received in broadcasted information in the another cell 123.

At least one of the first information and the second information may be received in an information element, such as the SRB-ToAddMod-NB-r13 or the SystemInformationBlockType22-NB information element, examples of which are shown below.

An example of how this may be signalled through L3/RRC is provided below. This may be provided to the wireless device 130 in SIB2-NB or SIB22-NB in the new cell, e.g., the another cell 123, or via dedicated signalling in the old cell, e.g., the first cell 121.

One alternative to introduce the IE may be in SIB22-NB illustrated with bold underlined text below, where only option 1 and 3 may need to be present and the absence of the IE may mean that the legacy UE_ID based method may need to be applied.

If the IE may instead be introduced as part of dedicated signalling, all three options may be beneficial to use, e.g., the IE may then look as follows:

fallBackPagingCarrier-r17 ENUMERATED {anchor, ue_id, dedicated_same_TA, dedicated_same_eNB}

The IE SystemInformationBlockType22-NB may contain radio resource configuration for paging and random access procedure on non-anchor carriers.

SystemInformationBlockType22-NB information element

```
-- ASN1START
SystemInformationBlockType22-NB-r14 ::= SEQUENCE {
   dl-ConfigList-r14                DL-ConfigCommonList-NB-r14      OPTIONAL,    -- Need OR
   ul-ConfigList-r14                UL-ConfigCommonList-NB-r14      OPTIONAL,    -- Need OR
   pagingWeightAnchor-r14           PagingWeight-NB-r14             OPTIONAL,    -- Cond pcch-
config
   nprach-ProbabilityAnchorList-r14 NPRACH-ProbabilityAnchorList-NB-r14 OPTIONAL,    -- Cond
nprach-config
   lateNonCriticalExtension         OCTET STRING                     OPTIONAL,
   ...,
   [[ mixedOperationModeConfig-r15  SEQUENCE {
         dl-ConfigListMixed-r15        DL-ConfigCommonList-NB-r14    OPTIONAL,    -- Cond dl-
ConfigList
         ul-ConfigListMixed-r15        UL-ConfigCommonList-NB-r14    OPTIONAL,    -- Cond ul-
ConfigList
         pagingDistribution-r15        ENUMERATED {true}             OPTIONAL,    -- Need OR
         nprach-Distribution-r15       ENUMERATED {true}             OPTIONAL,    -- Need OR
      }                                                              OPTIONAL,    -- Need OR
      ul-ConfigList-r15             UL-ConfigCommonListTDD-NB-r15    OPTIONAL     -- Cond TDD
   ]],
   [[
      fallBackPagingCarrier-r17        ENUMERATED {anchor, dedicated_same_TA,
dedicated_same_eNB } OPTIONAL--
            Need OR
   ]]
}
DL-ConfigCommonList-NB-r14 ::=    SEQUENCE (SIZE (1.. maxNonAnchorCarriers-NB-r14)) OF
                                     DL-ConfigCommon-NB-r14
...
-- ASN1STOP
```

Another non-limiting example may be as follows, wherein NPRACH indicates NB-IoT Physical Random Access Channel:

SystemInformationBlockType22-NB information element

```
-- ASN1START
SystemInformationBlockType22-NB-r14 :: = SEQUENCE {
   dl-ConfigList-r14                DL-ConfigCommonList-NB-r14      OPTIONAL,      -- Need OR
   ul-ConfigList-r14                UL-ConfigCommonList-NB-r14      OPTIONAL,      -- Need OR
   pagingWeightAnchor-r14           PagingWeight-NB-r14             OPTIONAL,      -- Cond pcch-
config
   nprach-ProbabilityAnchorList-r14 NPRACH-ProbabilityAnchorList-NB-r14 OPTIONAL,        -- Cond
nprach-config
   lateNonCriticalExtension         OCTET STRING                     OPTIONAL,
   ...,
   [[ mixedOperationModeConfig-r15  SEQUENCE {
         dl-ConfigListMixed-r15        DL-ConfigCommonList-NB-r14    OPTIONAL,      -- Cond dl-
ConfigList
         ul-ConfigListMixed-r15        UL-ConfigCommonList-NB-r14    OPTIONAL,      -- Cond ul-
ConfigList
         pagingDistribution-r15        ENUMERATED {true}             OPTIONAL,      -- Need OR
         nprach-Distribution-r15       ENUMERATED {true}             OPTIONAL       -- Need OR
      }                                                              OPTIONAL,      -- Need OR
      ul-ConfigList-r15             UL-ConfigCommonListTDD-NB-r15    OPTIONAL       -- Cond TDD
   ]],
   [[
      fallBackPagingCarrier-r17     ENUMERATED {anchor, ue_id, dedicated} OPTIONAL       -- Need
OR
   ]]
}
DL-ConfigCommonList-NB-r14 :: =   SEQUENCE (SIZE (1.. maxNonAnchorCarriers-NB-r14)) OF
                                     DL-ConfigCommon-NB-r14
...
```

tion Setup/Resume/ReEstablishment/Release may be used, but the exact details on parameters that may be used are not disclosed. It may be enough with just transmitting an Rmax There may be several options for how the dedicated paging carrier may be signaled to the wireless device 130 through dedicated signaling. From PCT/EP2017/075268, it is already clear that any of the L3 messages RRC Connec- and the carrier identity, e.g., E-UTRA Absolute Radio Frequency Channel Number (EARFCN) or offset compared to anchor carrier or a pointer and/or index to the SIB22-list of carriers.

In a group of examples, a dedicated signaling may be extended where the common configuration of a DL non-anchor carrier, e.g., the IE DL-CarrierConfigCommon-NB-r14, together with the Rmax, e.g., npdcch-NumRepetition-Paging-r13 or npdcch-NumRepetitionPaging-r14, may be used.

In an alternate group of examples, to save signaling, only the carrier Index from SIB22-NB that points to a non-anchor carrier may be used.

A choice structure may be provided as an example of signaling extension according to the following: 1) point to a pagingCarrierIndex, e.g., in SIB22, or 2) include a carrier that is not present in SIB22 and then include other parameters such as Discontinuous Reception (DRX) cycle and Rmax value. The wireless device 130 may select a matching carrier based upon any of these values.

Thus, other information such as DRX cycle of that carrier may also be optionally included. If they are not present, then wireless device 130 may need to either obtain it from SIB2-NB, e.g., IE RadioResourceConfigCommonSIB-NB-r13, or the SIB22-NB in case the indexed carrier may be used.

An example in Abstract Syntax Notation one (ASN.1) of the carrier in dedicated signalling is provided below.

RadioResourceConfigDedicated-NB

The IE RadioResourceConfigDedicated-NB may be used to setup/modify/release Radio Bearers (RBs), to modify the Medium Access Control (MAC) main configuration, and to modify dedicated physical configuration.

RadioResourceConfigDedicated-NB information element

```
-- ASN1START
RadioResourceConfigDedicated-NB-r13 ::= SEQUENCE {
   srb-ToAddModList-r13            SRB-ToAddModList-NB-r13           OPTIONAL,      -- Need
ON
   drb-ToAddModList-r13            DRB-ToAddModList-NB-r13           OPTIONAL,      -- Need
ON
   drb-ToAddModList-r13            DRB-ToAddModList-NB-r13           OPTIONAL,      -- Need
ON
   mac-MainConfig-r13              CHOICE {
      explicitValue-r13               MAC-MainConfig-NB-r13,
      defaultValue-r13                NULL
   }                                                                 OPTIONAL,    -- Need
ON
   physicalConfigDedicated-r13     PhysicalConfigDedicated-NB-r13    OPTIONAL,    -- Need
ON
   rlf-TimersAndConstants-r13      RLF-TimersAndConstants-NB-r13     OPTIONAL,    -- Need
ON
   ...,
   [[ schedulingRequestConfig-r15  SchedulingRequestConfig-NB-r15    OPTIONAL     -- Need
ON
   ]],
   [[ newUE-Identity-r16           C-RNTI                            OPTIONAL     -- Need
OP
   ]]
}
SRB-ToAddModList-NB-r13 ::=     SEQUENCE (SIZE (1)) OF SRB-ToAddMod-NB-r13
SRB-ToAddMod-NB-r13 :: =        SEQUENCE {
   rlc-Config-r13                  CHOICE {
      explicitValue                   RLC-Config-NB-r13,
      defaultValue                    NULL
   } OPTIONAL,                                                              -- Cond Setup
   logicalChannelConfig-r13        CHOICE {
      explicitValue                   LogicalChannelConfig-NB-r13,
      defaultValue                    NULL
   } OPTIONAL,                                                              -- Cond Setup
   ...,
   [[ rlc-Config-v1430             RLC-Config-NB-v1430          OPTIONAL       -- Need ON
   ]],
   [[
      pagingCarrier-r17         CHOICE {
         blerThresholdTarget-r17      INTEGER {1..10}    OPTIONAL,      -- Need OR
         pagingCarrierIndex-r17      INTEGER(0..15)     OPTIONAL,      -- Need OR
         otherPagingCarrier-r17      SEQUNECE {
            assignedCarrier-r17         DL-CarrierConfigCommon-NB-r14
            npdcch-NumRepetitionPaging-r14            ENUMERATED {
               r1, r2, r4, r8, r16, r32, r64, r128,
               r256, r512, r1024, r2048,
               spare4, spare3, spare2, spare1}OPTIONAL, -- Need OR
         drx-Cycle-r17      CHOICE {
            shortDrx-Cycle       ENUMERAED { sf256, sf512, sf1024, sf1536}

            longDrx-Cycle      ENUMERATED { sf2048, sf3072,
               sf4096, sf4608, sf6144, sf7680, sf8192, sf9216}
         }           OPTIONAL - Need OR
   ]]
}
DRB-ToAddModList-NB-r13 ::=     SEQUENCE (SIZE (1..maxDRB-NB-r13)) OF DRB-ToAddMod-NB-r13
DRB-ToAddMod-NB-r13 ::=         SEQUENCE {
   eps-BearerIdentity-r13          INTEGER (0..15)              OPTIONAL,       -- Cond DRB-
Setup-EPC
```

-continued

| RadioResourceConfigDedicated-NB information element | | | |
|---|---|---|---|
| drb-Identity-r13 | DRB-Identity, | | |
| pdcp-Config-r13 | PDCP-Config-NB-r13 | OPTIONAL, | -- Cond Setup |
| rlc-Config-r13 | RLC-Config-NB-r13 | OPTIONAL, | -- Cond Setup |
| logicalChannelIdentity-r13 | INTEGER (3..10) | OPTIONAL, | -- Cond DRB-Setup |
| logicalChannelConfig-r13 | LogicalChannelConfig-NB-r13 | OPTIONAL, | -- Cond Setup |
| ..., | | | |
| [[ rlc-Config-v1430 | RLC-Config-NB-v1430 | OPTIONAL | -- Need ON |
| ]], | | | |
| [[ pdu-Session-r16 | PDU-SessionID-NB-r16 | OPTIONAL | -- Cond DRB-Setup-5GC |
| ]] | | | |
| } | | | |
| PDU-SessionID-NB-r16 ::= | INTEGER (0..255) | | |
| DRB-ToReleaseList-NB-r13 ::= | SEQUENCE (SIZE (1..maxDRB-NB-r13)) OF DRB-Identity | | |
| -- ASN1STOP | | | |

The above signaling delta, indicated in bold underlined font, may also be added on top level Msg4 or in RRC Connection Release or RRC Reconfiguration message.

Signaling details on some of the other parameters mentioned above for example multiple NPDCCH BLER thresholds and hysteresis values are not disclosed illustratively further herein, but they may be added into either dedicated signaling IEs, e.g. to the SRB-ToAddMod-NB-r13, or as part of SIB22-NB.

Even if the above solutions/examples are provided in the context of NB-IoT, similar mechanisms may apply for other technologies such as LTE-M and NR. For example, in the former, a paging narrowband may be used and in the latter a paging Bandwidth Part (BWP) may be used in a similar way as the NB-IoT paging carrier.

CE Level Based

Further, there may be one more approach where the NW may allocate a particular paging carrier including CE level from that carrier where the wireless device 130 may need to monitor for paging. The CE level may be associated or derived based upon the already existing NRSRP threshold values or new threshold values defined for paging purpose. Thus, the network may assign the wireless device 130 a CE level, besides a particular carrier, via dedicated signalling; an example; prior to releasing the wireless device 130 to idle or via Msg4.

If the condition changes, e.g., the wireless device 130 may find itself in a different CE level, for example requiring more repetitions, the wireless device 130 may follow the fall-back mechanism as illustrated in above example: 1) the anchor carrier or 2) using the legacy procedure, based on UE_ID, or 3) the dedicated paging carrier from the previous cell.

Further Redirection

The network may assign a dedicated paging carrier to the wireless device 130, however if there is a need to use that carrier for another purpose in the meantime, the wireless device 130 may need to be notified. This may be done either with paging the wireless device 130 so that wireless device 130 may trigger the random-access procedure to establish a connection, or with an indication broadcasted in system information, or as part of a system information notification update that such carrier cannot be used for paging anymore and UEs impacted may need to fallback to the legacy method based on UE-ID, or as specified in previous sections.

By obtaining the first information in this Action 202, the wireless device 130 may be enabled to know how to determine the carrier to be used to monitor paging on a change in coverage due to a change in the coverage condition or the cell to camp on. The wireless device 130 may therefore be configured to flexibly select the carrier to be used for paging based on coverage levels, so that for example, if the wireless device 130 is in good coverage, the wireless device 130 may be configured to monitor paging in non-power boosted carrier(s) whereas if the wireless device 130 is in poor coverage, it may be configured to monitor paging in a power boosted carrier. Hence, power consumption by the wireless device 130 during paging may be thereby reduced.

Paging delay may also be reduced since, for example, the wireless device 130 may not need to wait longer to receive the PDSCH carrying the paging message, which may be scheduled by PDCCH, that is, fewer number of repetitions may be required, hence less delay.

Furthermore, specific paging carrier configuration may be understood to be helpful for capacity increase and paging load control since paging in non-anchor carrier(s) may alleviate the reliance upon e.g., an anchor carrier, and may free up resources in the anchor carrier and further provide a means to handle increased paging load if any.

For example, for an NB-IoT cell with the anchor carrier being power-boosted, by for example 6 dB, and non-anchor carriers not being power-boosted, which may be understood to be a typical deployment today, all, or a very large part, of the good coverage UEs may be configured to be monitoring paging on the non-anchor carriers and the poor coverage UEs may be configured to monitor paging on the anchor carrier. This coverage level-based paging approach may be understood to save both UE power and spectrum resources, as less radio resources may be needed to page the poor coverage UEs, and for example multiplex paging to multiple UEs on the non-anchor carrier may be performed, which may be more efficient.

According to embodiments herein, dedicated RRC configuration may be introduced to allow the first network node 111 to assign a paging carrier to the wireless device 130 other than that that may be selected based on the UE_ID.

According to embodiments herein, dedicated RRC configuration may be introduced for the wireless device 130 to use a paging carrier other than the dedicated paging carrier in case its coverage level/condition may deteriorate within the cell.

According to embodiments herein, dedicated and/or broadcasted RRC configuration may be introduced for the wireless device 130 to use a paging carrier other than the dedicated paging carrier in case a new cell may be selected.

Action 203

In some of the embodiments, the wireless device 130 may have received the first information in the first cell 121, and the wireless device 130 may camp on the another cell 123, e.g., after it may have moved. In some embodiments such as these, the method may further comprise Action 203. In this Action 203, the wireless device 130 may obtain the second information in the another cell 123 indicating how to select the carrier to be used for paging in the another cell 123. The carrier may be further determined based on the obtained second information.

Obtaining may comprise, receiving or retrieving. The obtaining in this Action 203 may be in the another cell 123, e.g., by receiving via the second link 142.

By obtaining the second information in this Action 203, the wireless device 130 may be enabled to know how to determine the carrier to be used to monitor paging on a change in coverage due to a change in cell to camp on. Hence, paging delay may be reduced and power consumption by the wireless device 130 during paging may be thereby reduced. Furthermore, specific paging carrier configuration may be understood to be helpful for capacity increase and paging load control.

Action 204

In this Action 204, the wireless device 130 determines the carrier to monitor paging based on the obtained first information in Action 202.

Determining in this Action 204 may comprise deciding or calculating.

The carrier may be further determined based on the obtained second information.

The determining in this Action 204 may be performed while the wireless device 130 may be in idle state. The idle state may be, e.g., as defined in NB-IoT or LTE or in a younger system having equivalent functionality.

By, in this Action 204, determining the carrier to monitor paging based on the obtained first information, or based on the second information, the wireless device 130 may be enabled to reduce the paging delay and the power consumption during paging may be thereby. Furthermore, the paging load may be controlled and the capacity of the wireless communications system 100 may be increased.

Action 205

In this Action 205, the wireless device 130 may tune to the determined carrier to monitor paging.

Embodiments of a method, performed by the first network node 111, will now be described with reference to the flowchart depicted in FIG. 3. The method may be understood to be for handling the carrier to monitor paging. The first network node 111 operates in the wireless communications network 100.

In some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

The method may be understood to be a computer-implemented method.

The method may comprise one or more of the following actions. In some embodiments, all the actions may be performed. One or more embodiments may be combined, where applicable. Components from one embodiment may be tacitly assumed to be present in another embodiment and it will be obvious to a person skilled in the art how those components may be used in the other exemplary embodiments. All possible combinations are not described to simplify the description. A non-limiting example of the method performed by the first network node 111 is depicted in FIG. 3. In FIG. 3, optional actions in some embodiments may be represented with dashed lines.

The detailed description of some of the following corresponds to the same references provided above, in relation to the actions described for the wireless device 130 and will thus not be repeated here to simplify the description. For example, the coverage condition may be determined based on a measure of radio coverage, e.g., estimated by the wireless device 130.

Action 301

In this Action 301, the first network node 111 may receive at least one of: a) the first indication from the wireless device 130, e.g., via the first link 141, and b) a second indication from the second network node 112 operating in the wireless communications network 100. The first indication or the second indication may be understood to indicate the capability of the wireless device 130 to support a change of paging carrier based on a change in coverage due to a change in at least one of: the coverage condition and the cell to camp on.

Action 302

In this Action 302, the first network node 111 sends the first information indicating, to the wireless device 130 operating in the communications network 100, how to determine the carrier to be used to monitor paging based on the change in coverage due to the change, for the wireless device 130, in at least one of: the coverage condition and the cell to camp on.

Sending may comprise transmitting. In some embodiments, the first information may be sent to the wireless device 130. In some examples, the first information may be sent to the wireless device 130, e.g., via the first link 141.

In some embodiments, the sent first information may be based on the received first indication.

The first information may comprise e.g., the one or more rules, and the one or more thresholds, such as the first threshold and the second threshold described earlier.

How to determine may be understood to mean for the wireless device 130 how to determine.

The measure or radio coverage may be, e.g., an error rate, such as e.g., BLER, in a control channel, such as e.g., the NPDCCH. The coverage condition may be determined based on a measure of radio coverage, e.g., estimated by the wireless device 130, e.g., using a maximum number of repetitions, on e.g., a first carrier, such as a dedicated paging carrier.

Another example of the measure of radio coverage may be, e.g., measured NRSRP, or SINR, etc. . . .

The coverage condition may be determined based on a measure of radio coverage for a given coverage level, e.g., a given number of repetitions.

The coverage condition may exclude coverage level.

That is, the coverage condition may be understood to refer to a condition of a radio channel, separate from, or independent from a number of repetitions.

The change in cell to camp on may be understood to refer to the fact that the wireless device 130 may be in the first cell 121, and it may then move out of the coverage of the first cell 121, and into the coverage of the one or more other cells 122, e.g., the another cell 123. In some examples, the wireless device 130 may then move back into the coverage of the first cell 122.

In some examples, the change in coverage may comprise one or more transitions from connected state to idle state, or a from idle state to connected state.

In some embodiments, the sent first information may indicate that at least one of the following options. According to a first option, with the proviso that a measure of the coverage condition may indicate poor coverage with respect to the first threshold, the wireless device 130 may be required to select the fourth carrier, e.g., an anchor carrier or another carrier different than the dedicated paging carrier. According to a second option, with the proviso that the measure of the coverage condition may indicate good coverage with respect to the second threshold, the wireless device 130 may be required to select the fifth carrier, e.g., the first carrier, such as the dedicated paging carrier.

In some embodiments, the first information may be sent in an information element, such as the SRB-ToAddMod-NB-r13 or the SystemInformationBlockType22-NB information element, an example of which has been shown earlier in this document.

The first information may indicate to use one of: the anchor carrier, the fixed carrier, e.g., the carrier derived based on the identifier of the wireless device 130, and the first carrier assigned as dedicated paging carrier via dedicated signalling.

The sent first information may indicate at least one of the following options. According to the first option, with the proviso that the wireless device 130 enters idle mode, the wireless device 130 may be required to use the first carrier assigned as dedicated paging carrier via dedicated signalling, and continue to apply the obtained first information until the wireless device 130 enters connected state next time. According to the second option, with the proviso that the wireless device 130 camps on another cell 123, and with the proviso that the second information on how to select the carrier to be used for paging is provided, e.g., broadcasted, in the another cell 123, the first indication may indicate that the wireless device 130 may need to determine the carrier to be used based on the second information. According to the third option, with the proviso that; a) the wireless device 130 camps on another cell 123, and b) the second information on how to select the carrier to be used for paging is absent, e.g., in broadcasts, in the another cell 123, and c) the first information indicates the fallback configuration, e.g., the second carrier, the first indication may indicate that the wireless device 130 may need to determine the carrier to be used based on the fallback configuration indicated, e.g., the second carrier, in the first information. According to the fourth option, wherein the first information lacks an indication of the fallback configuration, e.g., the second carrier, and with the proviso that: a) the wireless device 130 camps on another cell 123, b) the second information on how to select the carrier to be used for paging is absent, e.g., in broadcasts, in the another cell 123, the first indication may indicate that the wireless device 130 may need to determine the carrier to be used based on the third carrier, e.g., a fixed carrier, such as a carrier derived based on an identifier of the wireless device 130. According to the fifth option, with the proviso that: a) the wireless device 130 receives the first information in the first cell 121, camps on one or more other cells 122 without being in connected mode, and then re-selects the first cell 121, the first indication may indicate that the wireless device 130 may need to determine the carrier to be used based on the first information, e.g., based on the first carrier assigned as dedicated paging carrier via dedicated signalling.

In some embodiments, at least one of the following may apply. According to a first option, the first information may be sent in dedicated signalling or in broadcasted information, e.g., SIB2-NB or SIB22-NB in the first cell 121. According to a second option, the second information may be sent in broadcasted information in the another cell 123.

In some examples, the first network node 111 may have sent the first information in the first cell 121, and the wireless device 130 may camp on another cell 123. In some examples such as such examples, the sending in Action 302 may further comprise sending the second information.

The sending of the second information may be in the another cell 123, e.g., by sending via the second link 142.

The second information may indicate how to select the carrier to be used for paging in the another cell 123.

The first network node 11 may determine the carrier for the wireless device 130 to monitor paging, e.g., based on the sent first information.

The carrier may be further determined based on the obtained second information.

Action 303

In this Action 303, the first network node 111 may send third information to the second network node 112 operating in the wireless communications network 100, e.g., via the third link 143. The third information may indicate a paging carrier configured by the first network node 111 to page the wireless device 130 after a connection release.

By sending the third information in this Action 303, the first network node 111 enables the second network node 112 to know the paging carrier configured by the first network node 111 to page the wireless device 130 after the connection release. This may enable the second network node 112 to store the information and include the information for a next paging.

Action 304

In this Action 304, the first network node 111 may receive a third indication from the second network node 112 operating in the wireless communications network 100, e.g., via the third link 143. The third indication may indicate a paging carrier configured by the first network node 111, or another network node 113, to page the wireless device 130, e.g., after the connection release.

Embodiments of a method, performed by the second network node 112, will now be described with reference to the flowchart depicted in FIG. 4. The method may be understood to be for handling the carrier to monitor paging. The second network node 112 operates in the wireless communications network 100.

In some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

The method may be understood to be a computer-implemented method.

The method may comprise some of the following actions. In some embodiments, all the actions may be performed. One or more embodiments may be combined, where applicable. Components from one embodiment may be tacitly assumed to be present in another embodiment and it will be obvious to a person skilled in the art how those components may be used in the other exemplary embodiments. All possible combinations are not described to simplify the description. A non-limiting example of the method performed by second network node 112 is depicted in FIG. 4. In FIG. 4, optional actions in some embodiments may be represented with dashed lines.

The detailed description of some of the following corresponds to the same references provided above, in relation to the actions described for the wireless device 130 and will thus not be repeated here to simplify the description. For example, the coverage condition may be determined based on a measure of radio coverage, e.g., estimated by the wireless device 130.

Action 401

In this Action 401, the second network node 112 obtains the first indication indicating the capability of the wireless device 130 operating in the wireless communications network 100, to support a change of paging carrier based on a change in coverage due to a change in at least one of: the coverage condition and the cell to camp on.

In some examples, the second network node 112 may obtain, in this Action 401, another indication indicating the first indication, such as e.g., a fourth indication.

The obtaining in this Action 401 may be of at least one of: a) the first indication originating in the wireless device 130, and b) the another indication from e.g., the first network node 111 or the second network node 112 operating in the wireless communications network 100.

Obtaining may comprise, receiving or retrieving. The first indication originating in the wireless device 130 may be received e.g., via the first link 141 and the third link 143, via the first network node 111.

The another indication may e.g., be based on or comprise, or indicate the first indication, as originally provided by the wireless device 130.

The first indication or the another indication may indicate the capability of the wireless device 130. The capability may be to support a change of paging carrier based on a change in coverage due to a change in at least one of: the coverage condition and the cell to camp on.

The measure or radio coverage may be, e.g., e.g., an error rate, such as e.g., BLER, in a control channel, such as e.g., the NPDCCH. The coverage condition may be determined based on a measure of radio coverage, e.g., estimated by the wireless device 130, e.g., using a maximum number of repetitions, on e.g., a first carrier, such as a dedicated paging carrier.

Another example of the measure of radio coverage may be, e.g., measured NRSRP, or SINR, etc. . . .

The coverage condition may be determined based on a measure of radio coverage for a given coverage level, e.g., a given number of repetitions.

The coverage condition may exclude coverage level.

That is, the coverage condition may be understood to refer to a condition of a radio channel, separate from, or independent from a number of repetitions.

In some examples, the change in coverage may comprise one or more transitions from connected state to idle state, or a from idle state to connected state.

Action 402

In this Action 402, the second network node 112 sends the second indication to one of the first network node 111, or another network node 113. The second indication indicates the indicated capability. That is, the capability indicated in the obtained first indication.

The second network node 112 may send the second indication to one of the first network node 111, e.g., via the third link 143, or another network node, e.g., the another network node 113, e.g., via the fourth link 144.

The change in cell to camp on may be understood to refer to the fact that the wireless device 130 may be in the first cell 121, and it may then move out of the coverage of the first cell 121, and into the coverage of the one or more other cells 122, e.g., the another cell 123. In some examples, the wireless device 130 may then move back into the coverage of the first cell 122.

By sending the second indication in this Action 402, the second network node 112 may enable the first network node 111 or the another network node 113 to know the capability of the wireless device 130 and thereby use it to determine the paging carrier to be used to page the wireless device 130 after the connection release, in accordance with the capability of the wireless device 130. Since paging may be performed in idle more and initiated by the second network node 112, e.g., an MME, the first network node 111, e.g., an eNB, may not be able to fetch the capability from the wireless device 130. It may be understood to have to be obtained from the second network node 112.

Action 403

In this Action 403, the second network node 112 may receive the third information from the first network node 111, e.g., via the third link 143, or the another network node 113, e.g., via the fourth link 144. The third information may indicate the paging carrier configured by the first network node 111, or the another network node 113, to page the wireless device 130 after the connection release.

Action 404

In this Action 404, the second network node 112 may send the third indication to one of the first network node 111, e.g., via the third link 143, or the another network node 113, e.g., via the fourth link 144. The third indication may indicate the indicated paging carrier. That is, the third indication may indicate a paging carrier to page the wireless device 130.

The coverage level of the wireless device 130, e.g., a UE, may be understood to be a dynamic attribute, and this may change if NRSRP changes. A UE autonomous carrier selection based upon coverage level may cause mismatch on the selected carrier and the assigned/configured carrier for paging from the network. Thus, any potential approach may be understood to need to follow the legacy principle of deterministic paging carrier usage. That is, there should be no mismatch between the carrier the wireless device 130 may monitor for paging and where the network may expect to reach the wireless device 130 when paged in a certain coverage condition. Paging carrier selection may remain deterministic. This may ensure there may be no mismatch between which paging carrier the wireless device 130 may be monitoring and which paging carrier the network may be expecting the wireless device 130 to monitor. One approach described in embodiments herein may be to follow the legacy principle of paging, that is, the second network node 112, e.g., an MME, may page the wireless device 130 in the last known location first, and introduce enhancements for what paging carrier the wireless device 130 may use. For example, a method may be as listed below in a sequential order:

1. The wireless device 130 may monitor for paging in accordance with the pre-Rel-17 mechanism, e.g., based on UE_ID, as default behavior.

2. The first network node 111, an eNB, may assign a new paging carrier different from the one based on UE_ID to the wireless device 130 in connected mode or during connection establishment, whose attributes, e.g., Rmax, may be provided in a dedicated message or broadcasted signaling.

3. When the wireless device 130 is released to idle mode, the first network node 111 may inform the second network node 112, e.g., an MME about the assigned paging carrier and the wireless device 130 may monitor paging using the assigned carrier when it may camp on the same cell where it was released and may experience similar coverage conditions.

4. If the wireless device 130 moves away from the cell or the coverage situation/condition changes in the same cell, the wireless device 130 may monitor paging based on what may be signaled by the network to avoid any mismatch.

Figure 5:
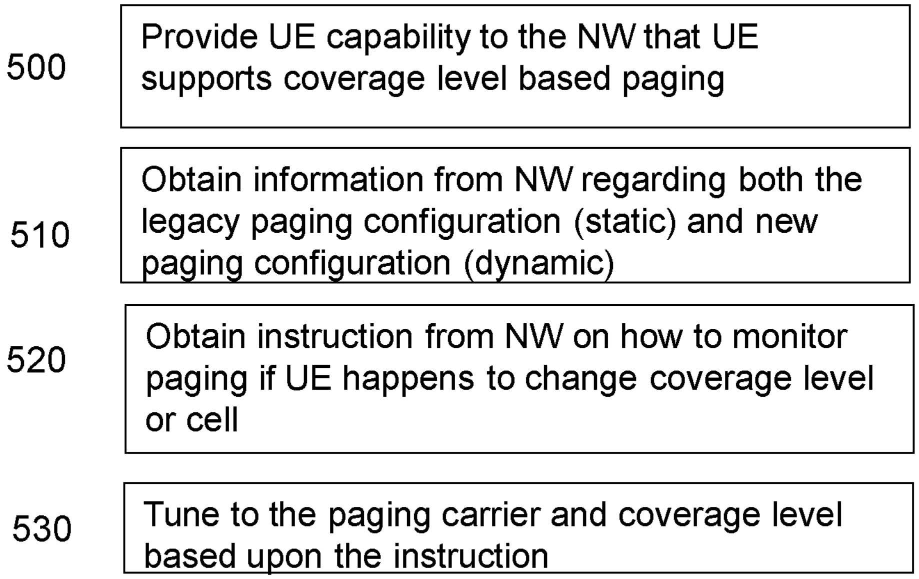
FIG. 5 is a schematic block diagram depicting a method in a wireless device, according to embodiments herein.

FIG. 5 depicts a non-limiting example of actions that may be performed by the wireless device 130, e.g., by a UE, according to embodiments herein. At 500, in accordance with Action 201, the wireless device 130 may provide its UE capability to the NW indicating that the wireless device 130 supports coverage level based paging. At 510, in accordance with Action 202 or Action 203, the wireless device 130 may obtain information from the NW regarding both the legacy paging configuration, static, and the new paging configuration, dynamic. At 520, in accordance with Action 202 or Action 203, the wireless device 130 may obtain instruction from the NW on how to monitor paging if the wireless device 130 happens to change coverage level or cell. At 530, in accordance with Action 204 and Action 205, the wireless device 130 may tune to the paging carrier and coverage level based upon the instruction.

Figure 6:
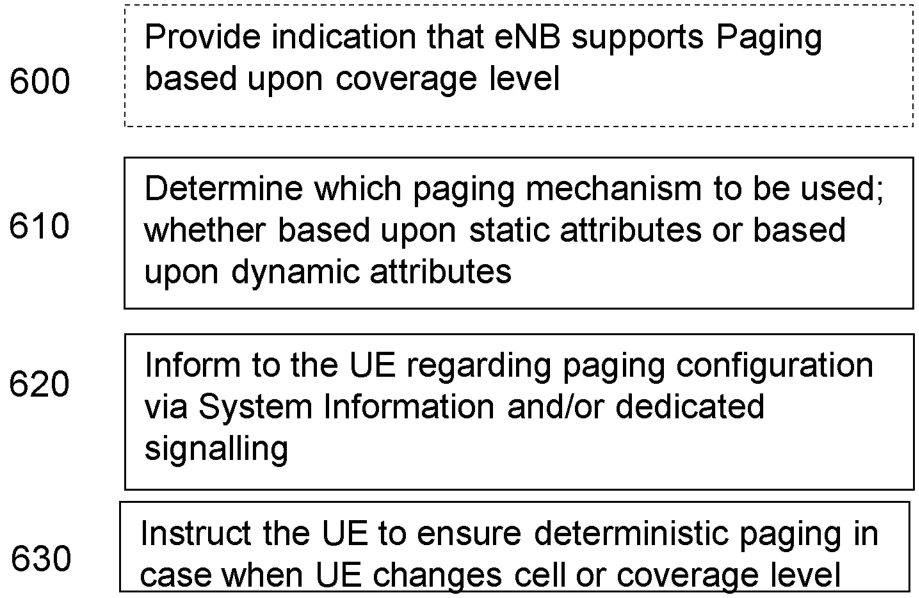
FIG. 6 is a schematic block diagram depicting a method in a first network node, according to embodiments herein.

FIG. 6 depicts a non-limiting example of actions that may be performed according to embodiments herein, by the first network node 111, e.g., eNB towards the UE. At 600, the first network node 111 may provide an indication that the eNB supports paging based upon coverage level. At 610, in accordance with Action 302, the first network node 111 may determine which paging mechanism to be used; whether based upon static attributes or based upon dynamic attributes. At 620, in accordance with Action 302, the first network node 111 may inform the wireless device 130 regarding the paging configuration via System Information and/or dedicated signalling. At 630, also in accordance with Action 302, the first network node 111 may instruct the wireless device 130 to ensure deterministic paging in case when the wireless device 130 may changes cell or coverage level.

Figure 7:
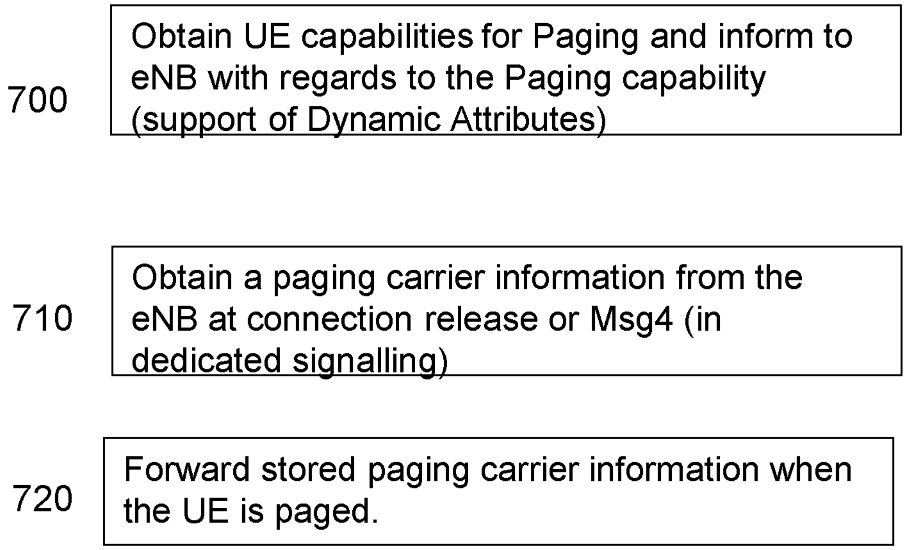
FIG. 7 is a schematic block diagram depicting a method in a second network node, according to embodiments herein.

FIG. 7 depicts a non-limiting example of actions that may be performed according to embodiments herein, by the second node 112, e.g., a CN node. At 700, in accordance with Action 401, second network node 112 may obtain the UE capabilities of the wireless device 130 for paging, and inform the first network node 111, e.g., an eNB, with regards to the paging capability, e.g., of the support of dynamic attributes. At 720, in accordance with Action 402, the second network node 112 may obtain a paging carrier information from the first network node 111 at connection release or Msg4, e.g., in dedicated signalling. At 720, in accordance with Action 403, the second network node 112 may forward the stored paging carrier information when the wireless device 130 may be paged.

As a summarized overview of the foregoing, UE behavior may be specified according to embodiments herein, in order to ensure deterministic paging so that in case of mobility, e.g., cell change, or a coverage condition change, as a result of degraded and/or improved signal quality, the NW may still page the UE by signaling well defined rules, that is, UE behavior, whilst providing flexibility to include dynamic attributes for paging carrier selection.

Certain embodiments disclosed herein may provide one or more of the following technical advantage(s), which may be summarized as follows. Paging delay may be understood to be reduced and UE power consumption during paging may be reduced for UEs. Specific paging carrier configuration may be helpful for capacity increase and paging load control.

Figure 8:
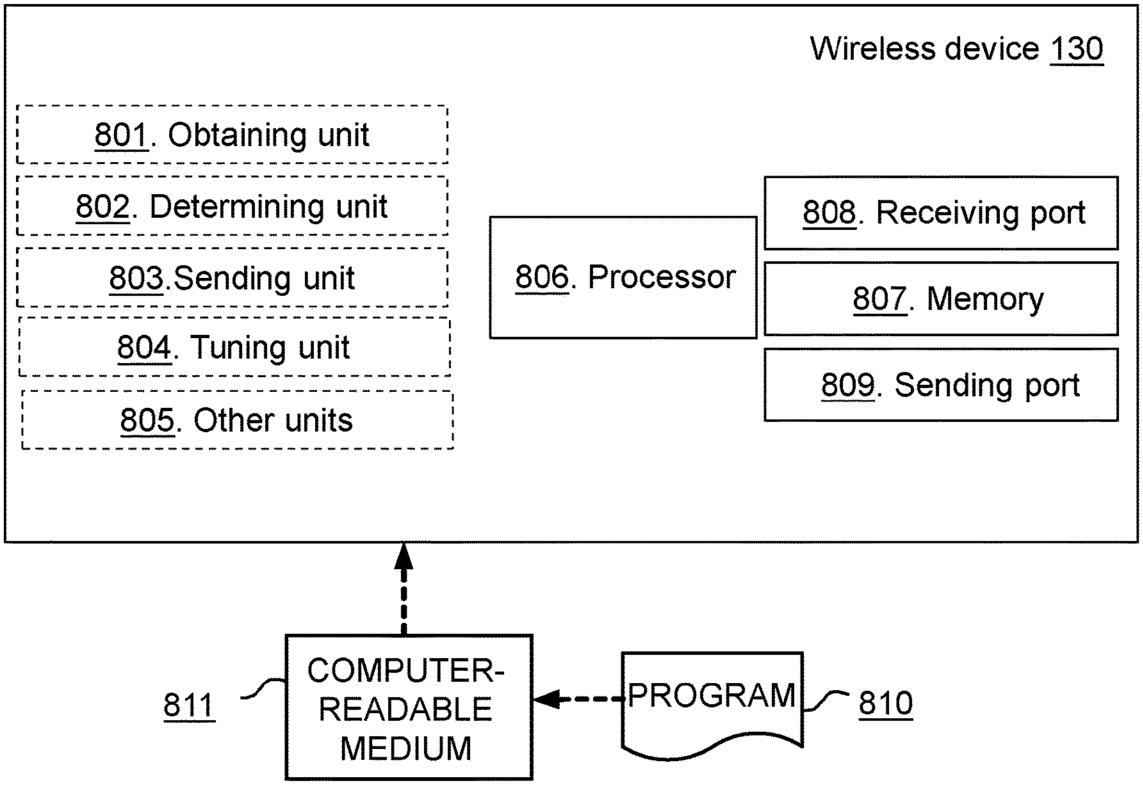
FIG. 8 is a schematic block diagram illustrating two embodiments, in panel a) and panel b), of a wireless device, according to embodiments herein.
Figure 8:
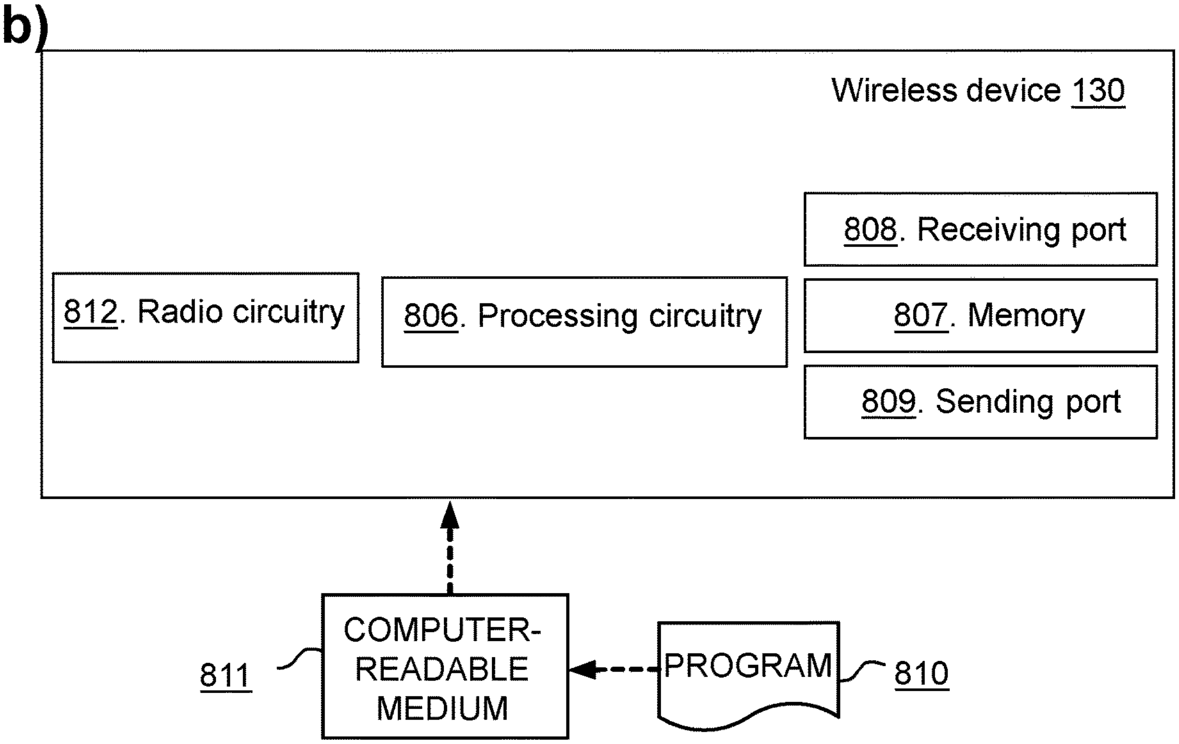

FIG. 8 depicts two different examples in panels a) and b), respectively, of the arrangement that the wireless device 130 may comprise to perform the method actions described above in relation to FIG. 2 and/or FIG. 5. In some embodiments, the wireless device 130 may comprise the following arrangement depicted in FIG. 8*a*. The wireless device 130 may be understood to be for handling the a carrier to monitor paging. The wireless device 130 is configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the wireless device 130 and will thus not be repeated here. For example, in some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

In FIG. 8, optional units are indicated with dashed boxes.

The wireless device 130 is configured to perform the obtaining of Action 202, e.g. by means of an obtaining unit 801 within the wireless device 130, configured to obtain the first information configured to indicate how to determine the carrier configured to be used to monitor paging based on a change in coverage due to a change in at least one of: the coverage condition and the cell to camp on.

The wireless device 130 is configured to perform the determining of Action 204, e.g. by means of a determining unit 802, configured to determine the carrier to monitor paging based on the first information configured to be obtained.

In some embodiments, the first information configured to be obtained may be configured to indicate at least one of the following options. According to a first option, with the proviso that the wireless device 130 enters idle mode, the wireless device 130 may be required to use the first carrier configured to be assigned as dedicated paging carrier via dedicated signalling, and continue to apply the first information configured to be obtained until the wireless device 130 enters connected state next time. According to a second option, with the proviso that the wireless device 130 camps on another cell 123, and with the proviso that second information on how to select the carrier to be used for paging is provided in the another cell 123, the wireless device 130 may be required to determine the carrier to be used based on the second information. According to a third option, with the proviso that: a) the wireless device 130 camps on another cell 123, b) the second information on how to select the carrier to be used for paging is absent in the another cell 123, and c) the first information indicates a fallback configuration, the wireless device 130 may be required to determine the carrier to be used based on the fallback configuration configured to be indicated in the first information. According to a fourth option, with the proviso that: a) the wireless device 130 camps on another cell 123, b) the second information on how to select the carrier to be used for paging is absent in the another cell 123, and c) the first information lacks an indication of the fallback configuration, the wireless device 130 may be required to determine the carrier to be used based on the third carrier, such as a carrier configured to be derived based on an identifier of the wireless device 130. According to a fifth option, with the proviso that: a) the wireless device 130 receives the first information in a first cell 121, camps on one or more other cells 122 without being in connected mode, and then re-selects the first cell 121, the wireless device 130 may be required to determine the carrier to be used based on the first information.

In some embodiments, the first information configured to be obtained may be configured to indicate that at least one of the following options. According to one option, with the proviso that a measure of the coverage condition indicates poor coverage with respect to the first threshold, the wireless device 130 is to select the fourth carrier. According to another option, with the proviso that the measure of the coverage condition indicates good coverage with respect to the second threshold, the wireless device 130 is to select the fifth carrier.

In some embodiments, at least one of the following may apply. In some embodiments, the first information may be configured to be received in dedicated signalling or in broadcasted information in the first cell 121. In some embodiments, the second information may be configured to be received in broadcasted information in the another cell 123.

In some embodiments, at least one of the first information and the second information may be configured to be received in an information element.

In some embodiments, the first information may be configured to indicate to use one of: the anchor carrier, the fixed carrier, and the first carrier configured to be assigned as dedicated paging carrier via dedicated signalling.

In some embodiments, the first information may be configured to be received from the first network node 111 configured to be operating in the wireless communications network 100.

The wireless device 130 may be configured to perform the sending of Action 201, e.g. by means of a sending unit 803, configured to send the first indication to the first network node 111. The first indication may be configured to indicate the capability of the wireless device 130 to support the change of paging carrier based on the change in coverage due to the change in at least one of: the coverage condition and the cell to camp on. The first information configured to be obtained may be configured to be based on the first indication configured to be sent.

In some embodiments, the wireless device 130 may be further configured to, having received the first information in the first cell 121, and camping on another cell 123, The wireless perform the obtaining of Action 203, e.g. by means of the obtaining unit 801, configured to, obtain the second information in the another cell 123 configured to indicate how to select the carrier to be used for paging in the another cell 123. The carrier may be further configured to be determined based on the second information configured to be obtained.

In some embodiments, the coverage condition may be configured to be determined based on the measure of radio coverage configured to be estimated by the wireless device 130.

The wireless device 130 may be configured to perform the tuning of Action 205, e.g. by means of a tuning unit 804 within the wireless device 130, configured to, tune to the carrier configured to be determined to monitor paging.

Other units 805 may be comprised in the wireless device 130.

The embodiments herein in the wireless device 130 may be implemented through one or more processors, such as a processor 806 in the wireless device 130 depicted in FIG. 8*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 807 comprising one or more memory units. The memory 807 is arranged to be used to store obtained information, store data, configurations, schedulings, and applications etc. to perform the methods herein when being executed in the wireless device 130.

In some embodiments, the wireless device 130 may receive information from, e.g., the first network node 111, the second network node 112, and/or the another network node 113, through a receiving port 808. In some embodiments, the receiving port 808 may be, for example, connected to one or more antennas in wireless device 130. In other embodiments, the wireless device 130 may receive information from another structure in the wireless communications network 100 through the receiving port 808. Since the receiving port 808 may be in communication with the processor 806, the receiving port 808 may then send the received information to the processor 806. The receiving port 808 may also be configured to receive other information.

The processor 806 in the wireless device 130 may be further configured to transmit or send information to e.g., the first network node 111, the second network node 112, the another network node 113, and/or another structure in the wireless communications network 100, through a sending port 809, which may be in communication with the processor 806, and the memory 807.

Those skilled in the art will also appreciate that the different units 801-805 described above may refer to a combination of analog and digital modules, and/or one or more processors configured with software and/or firmware, e.g., stored in memory, that, when executed by the one or more processors such as the processor 806, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 801-805 described above may be implemented as one or more applications running on one or more processors such as the processor 806.

Thus, the methods according to the embodiments described herein for the wireless device 130 may be respectively implemented by means of a computer program 810 product, comprising instructions, i.e., software code portions, which, when executed on at least one processor 806, cause the at least one processor 806 to carry out the actions described herein, as performed by the wireless device 130. The computer program 810 product may be stored on a computer-readable storage medium 811. The computer-readable storage medium 811, having stored thereon the computer program 810, may comprise instructions which, when executed on at least one processor 806, cause the at least one processor 806 to carry out the actions described herein, as performed by the wireless device 130. In some embodiments, the computer-readable storage medium 811 may be a non-transitory computer-readable storage medium, such as a CD ROM disc, or a memory stick. In other embodiments, the computer program 810 product may be stored on a carrier containing the computer program 810 just described, wherein the carrier is one of an electronic signal, optical signal, radio signal, or the computer-readable storage medium 811, as described above.

The wireless device 130 may comprise a communication interface configured to facilitate communications between the wireless device 130 and other nodes or devices, e.g., the first network node 111, the second network node 112, the another network node 113, and/or another structure in the wireless communications network 100. The interface may, for example, include a transceiver configured to transmit and receive radio signals over an air interface in accordance with a suitable standard.

In other embodiments, the wireless device 130 may comprise the following arrangement depicted in FIG. 8*b*. The wireless device 130 may comprise a processing circuitry 806, e.g., one or more processors such as the processor 806, in the wireless device 130 and the memory 807. The wireless device 130 may also comprise a radio circuitry 812, which may comprise e.g., the receiving port 808 and the sending port 809. The processing circuitry 812 may be configured to, or operable to, perform the method actions according to FIG. 2 and/or FIG. 5, in a similar manner as that described in relation to FIG. 8*a*. The radio circuitry 812 may be configured to set up and maintain at least a wireless connection with the first network node 111, the second network node 112, the another network node 113, and/or another structure in the wireless communications network 100. Circuitry may be understood herein as a hardware component.

Figure 2:
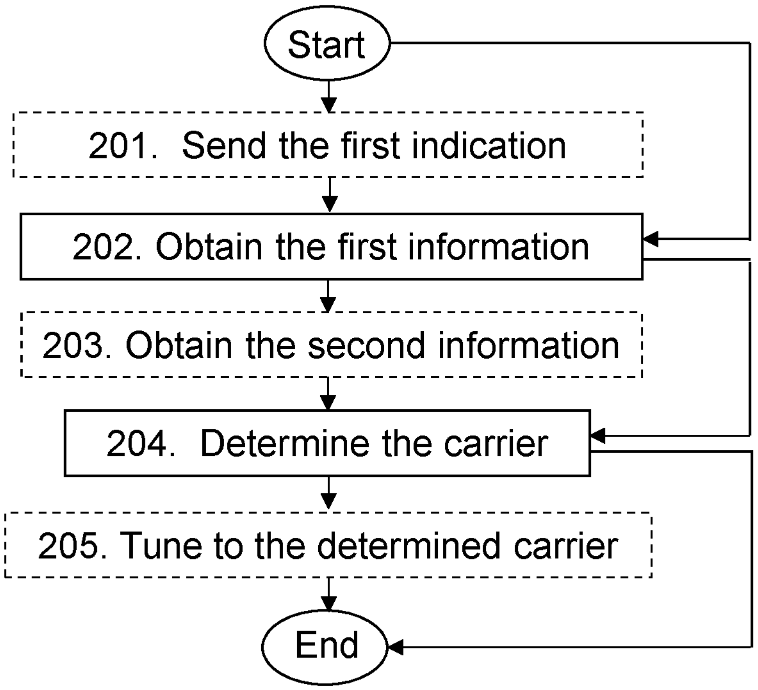
FIG. 2 is a flowchart depicting a method in a wireless device, according to embodiments herein.

Hence, embodiments herein also relate to the wireless device 130 comprising the processing circuitry 806 and the memory 807, said memory 807 containing instructions executable by said processing circuitry 806, whereby the wireless device 130 is operative to perform the actions described herein in relation to the wireless device 130, e.g., in FIG. 2, and/or FIG. 5.

Figure 9:
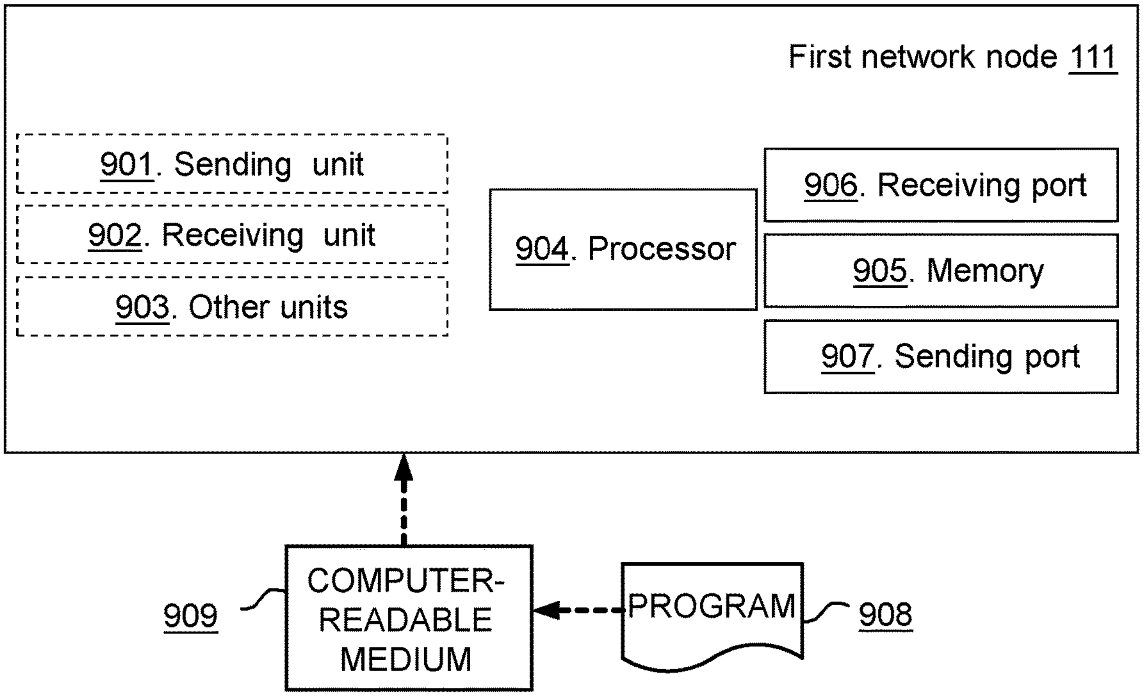
FIG. 9 is a schematic block diagram illustrating two embodiments, in panel a) and panel b), of a first network node, according to embodiments herein.
Figure 9:
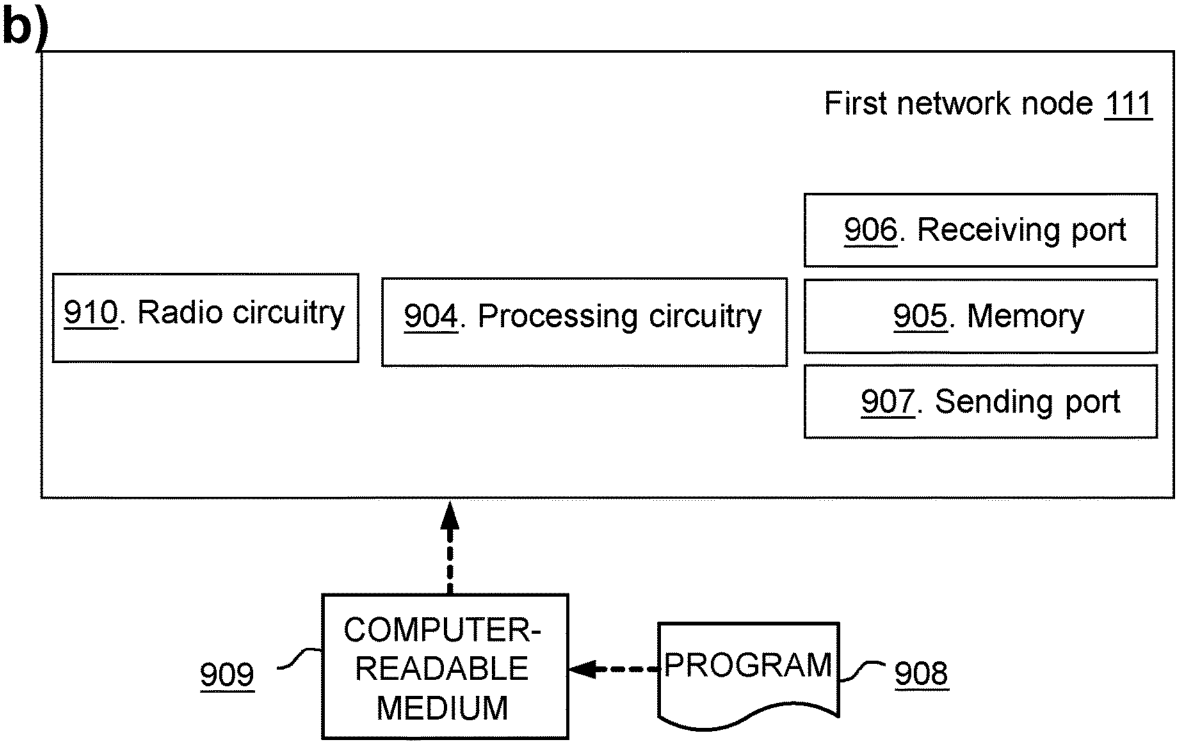

FIG. 9 depicts two different examples in panels a) and b), respectively, of the arrangement that the first network node 111 may comprise to perform the method actions described above in relation to FIG. 3 and/or FIG. 6. In some embodiments, the first network node 111 may comprise the following arrangement depicted in FIG. 9*a*. The first network node 111 may be understood to be for handling the carrier to monitor paging. The first network node 111 is configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the wireless device 130 and will thus not be repeated here.

For example, in some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

In FIG. 9, optional modules are indicated with dashed boxes.

The first network node 111 is configured to perform the sending of Action 302, e.g. by means of a sending unit 901 within the first network node 111, configured to send the first information configured to indicate, to the wireless device 130 configured to operate in the communications network 100, how to determine the carrier to be used to monitor paging based on a change in coverage due to a change, for the wireless device 130, in at least one of: the coverage condition and the cell to camp on.

In some embodiments, the first information configured to be sent may be configured to indicate at least one of the following options. According to a first option, with the proviso that the wireless device 130 enters idle mode, the wireless device 130 may be required to use the first carrier configured to be assigned as dedicated paging carrier via dedicated signalling, and continue to apply the first information configured to be obtained until the wireless device 130 enters connected state next time. According to a second option, with the proviso that the wireless device 130 camps on another cell 123, and with the proviso that the second information on how to select the carrier to be used for paging is provided in the another cell 123, the wireless device 130 may be required to determine the carrier to be used based on the second information. According to a third option, with the proviso that: a) the wireless device 130 camps on another cell 123, b) the second information on how to select the carrier to be used for paging is absent in the another cell 123, and c) the first information indicates a fallback configuration, the wireless device 130 may be required to determine the carrier to be used based on the fallback configuration configured to be indicated in the first information. According to a fourth option, wherein the first information lacks an indication of the fallback configuration and with the proviso that: a) the wireless device 130 camps on another cell 123, b) the second information on how to select the carrier to be used for paging is absent in the another cell 123, and, the wireless device 130 may be required to determine the carrier to be used based on the third carrier. According to a fifth option, with the proviso that: a) the wireless device 130 receives the first information in a first cell 121, camps on one or more other cells 122 without being in connected mode, and then re-selects the first cell 121, the wireless device 130 may be required to determine the carrier to be used based on the first information.

In some embodiments, the first information configured to be sent may be configured to indicate that at least one of the following options. According to one option, with the proviso that a measure of the coverage condition indicates poor coverage with respect to the first threshold, the wireless device 130 is to select the fourth carrier. According to another option, with the proviso that the measure of the coverage condition indicates good coverage with respect to the second threshold, the wireless device 130 is to select the fifth carrier.

In some embodiments, at least one of the following may apply. In some embodiments, the first information may be configured to be sent in dedicated signalling or in broadcasted information in the first cell 121. In some embodiments, the second information may be configured to be broadcasted information in the another cell 123.

In some embodiments, the first information may be configured to be sent in an information element.

In some embodiments, the first information may be configured to indicate to use one of: the anchor carrier, the fixed carrier, and the first carrier configured to be assigned as dedicated paging carrier via dedicated signalling.

In some embodiments, the first information may be configured to be sent to the wireless device 130.

The first network node 111 may be configured to perform the receiving of Action 301, e.g. by means of a receiving unit 902, configured to receive at least one of: a) the first indication from the wireless device 130 and b) the second indication from the second network node 112 configured to operate in the wireless communications network 100. The first indication or the second indication may be configured to indicate the capability of the wireless device 130 to support a change of paging carrier based on a change in coverage due to a change in at least one of: the coverage condition and the cell to camp on. The first information configured to be sent may be configured to be based on the first indication configured to be received.

The coverage condition may be configured to be determined based on the measure of radio coverage configured to be estimated by the wireless device 130.

The first network node 111 may be configured to perform the sending of Action 303, e.g. by means of the sending unit 901 within the first network node 111, configured to send the third information to the second network node 112 configured to operate in the wireless communications network 100. The third information may be further configured to indicate the paging carrier configured by the first network node 111 to page the wireless device 130 after a connection release.

The first network node 111 may be configured to perform the receiving of Action 304, e.g. by means of the receiving unit 902 within the first network node 111, configured to receive the third indication from the second network node 112 configured to operate in the wireless communications network 100. The third indication may be configured to indicate the paging carrier configured by the first network node 111, or another network node 113, to page the wireless device 130.

Other units 903 may be comprised in the first network node 111.

A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 905 comprising one or more memory units. The memory 905 is arranged to be used to store obtained information, store data, configurations, schedulings, and applications etc. to perform the methods herein when being executed in the first network node 111.

In some embodiments, the first network node 111 may receive information from, e.g., the wireless device 130, the second network node 112 and/or the another network node 113 through a receiving port 906. In some embodiments, the receiving port 906 may be, for example, connected to one or more antennas in first network node 111. In other embodiments, the first network node 111 may receive information from another structure in the wireless communications network 100 through the receiving port 906. Since the receiving port 906 may be in communication with the processor 904, the receiving port 906 may then send the received information to the processor 904. The receiving port 906 may also be configured to receive other information.

The processor 904 in the first network node 111 may be further configured to transmit or send information to e.g., the wireless device 130, the second network node 112, the another network node 113, and/or another structure in the wireless communications network 100, through a sending port 907, which may be in communication with the processor 904, and the memory 905.

Those skilled in the art will also appreciate that the different units 901-903 described above may refer to a combination of analog and digital modules, and/or one or more processors configured with software and/or firmware, e.g., stored in memory, that, when executed by the one or more processors such as the processor 904, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 901-903 described above may be implemented as one or more applications running on one or more processors such as the processor 904.

Thus, the methods according to the embodiments described herein for the first network node 111 may be respectively implemented by means of a computer program 908 product, comprising instructions, i.e., software code portions, which, when executed on at least one processor 904, cause the at least one processor 904 to carry out the actions described herein, as performed by the first network node 111. The computer program 908 product may be stored on a computer-readable storage medium 909. The computer-readable storage medium 909, having stored thereon the computer program 908, may comprise instructions which, when executed on at least one processor 904, cause the at least one processor 904 to carry out the actions described herein, as performed by the first network node 111. In some embodiments, the computer-readable storage medium 909 may be a non-transitory computer-readable storage medium, such as a CD ROM disc, or a memory stick. In other embodiments, the computer program 908 product may be stored on a carrier containing the computer program 908 just described, wherein the carrier is one of an electronic signal, optical signal, radio signal, or the computer-readable storage medium 909, as described above.

The first network node 111 may comprise a communication interface configured to facilitate communications between the first network node 111 and other nodes or devices, e.g., the wireless device 130, the second network node 112, the another network node 113, and/or another structure in the wireless communications network 100. The interface may, for example, include a transceiver configured to transmit and receive radio signals over an air interface in accordance with a suitable standard.

In other embodiments, the first network node 111 may comprise the following arrangement depicted in FIG. 9*b*. The first network node 111 may comprise a processing circuitry 904, e.g., one or more processors such as the processor 904, in the first network node 111 and the memory 905. The first network node 111 may also comprise a radio circuitry 910, which may comprise e.g., the receiving port 906 and the sending port 907. The processing circuitry 904 may be configured to, or operable to, perform the method actions according to FIG. 3 and/or FIG. 6, in a similar manner as that described in relation to FIG. 9*a*. The radio circuitry 910 may be configured to set up and maintain at least a wireless connection with the wireless device 130, the second network node 112, the another network node 113, and/or another structure in the wireless communications network 100. Circuitry may be understood herein as a hardware component.

Figure 3:
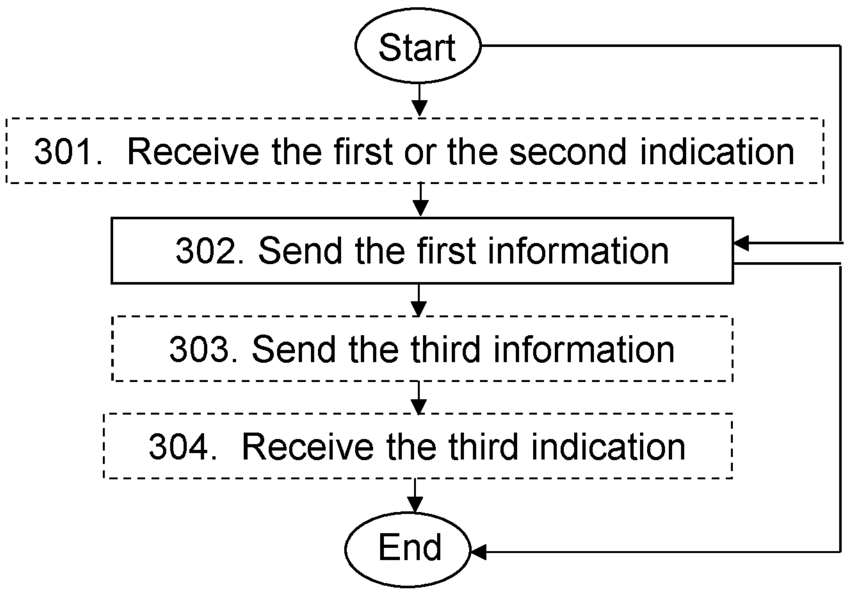
FIG. 3 is a flowchart depicting a method in a first network node, according to embodiments herein.

Hence, embodiments herein also relate to the first network node 111 comprising the processing circuitry 904 and the memory 905, said memory 905 containing instructions executable by said processing circuitry 904, whereby the first network node 111 is operative to perform the actions described herein in relation to the first network node 111, e.g., in FIG. 3 and/or FIG. 6.

Figure 10:
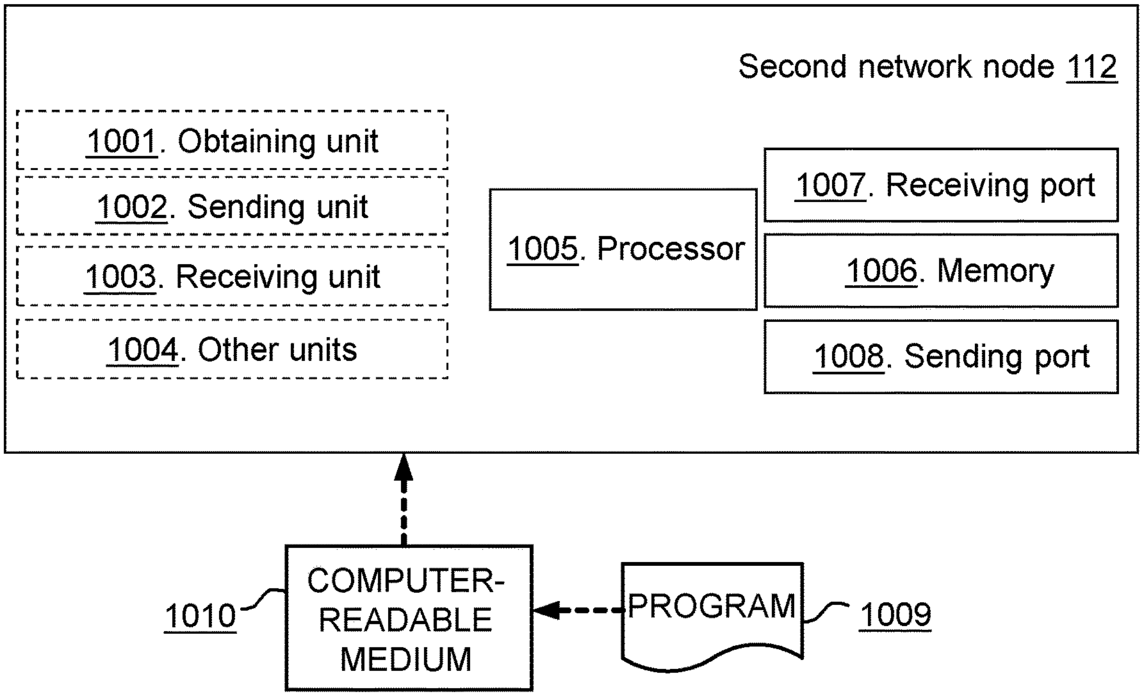
FIG. 10 is a schematic block diagram illustrating two embodiments, in panel a) and panel b), of a second network node, according to embodiments herein.
Figure 10:
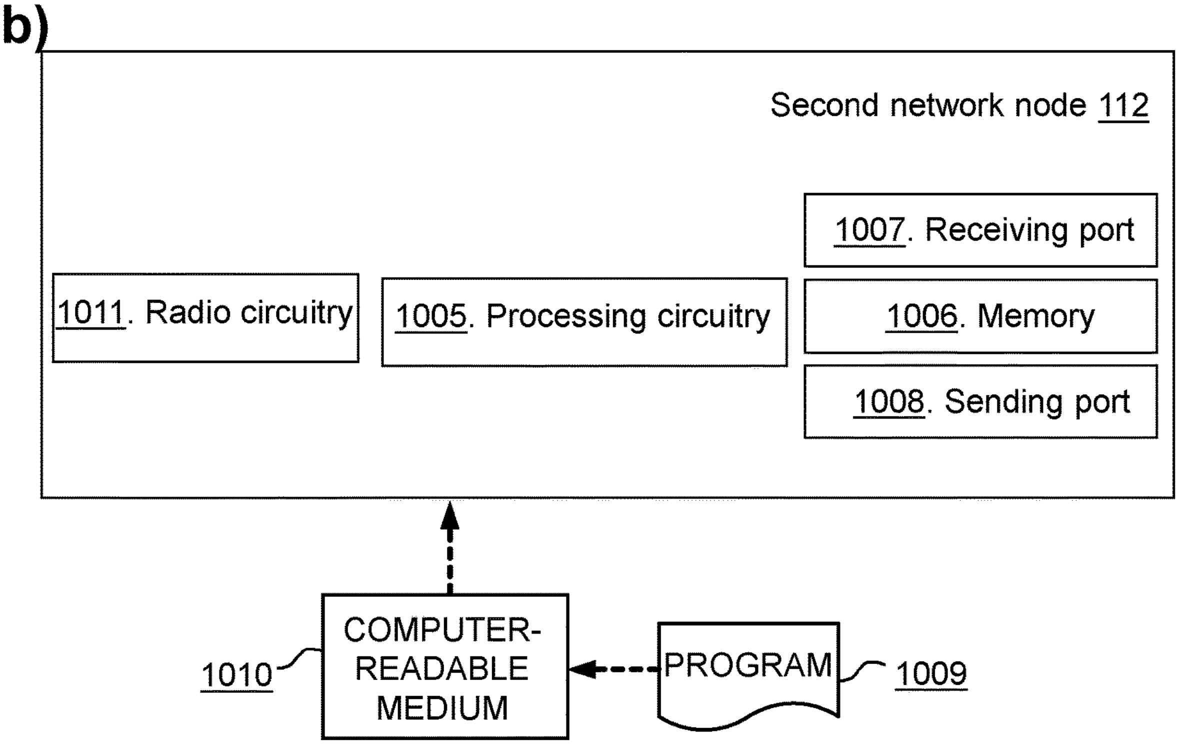

FIG. 10 depicts two different examples in panels a) and b), respectively, of the arrangement that the second network node 112 may comprise to perform the method actions described above in relation to FIG. 4 and/or FIG. 7. In some embodiments, the second network node 112 may comprise the following arrangement depicted in FIG. 10*a*. The second network node 112 may be understood to be for handling the carrier to monitor paging. The second network node 112 is configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the wireless device 130 and will thus not be repeated here.

For example, in some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

In FIG. 10, optional modules are indicated with dashed boxes.

The second network node 112 may be configured to perform the obtaining of Action 401, e.g. by means of an obtaining unit 1001, configured to obtain the first indication configured to indicate the capability of the wireless device 130 configured to operate in the wireless communications network 100, to support a change of paging carrier based on a change in coverage due to a change in at least one of: the coverage condition and the cell to camp on.

The second network node 112 may be configured to perform the sending of Action 402, e.g. by means of a sending unit 902 within the second network node 112, configured to send the second indication to one of the first network node 111, or another network node 113. The second indication is configured to indicate the capability configured to be indicated.

The second network node 112 may be configured to perform the receiving of Action 403, e.g. by means of a receiving unit 1003 within the second network node 112, configured to receive the third information from the first network node 111, or another network node 113. The third information may be configured to indicate the paging carrier configured by the first network node 111, or the another network node 113, to page the wireless device 130 after a connection release.

The second network node 112 may be configured to perform the sending of Action 404, e.g. by means of the sending unit 1002 within the second network node 112, configured to send the third indication to one of the first network node 111 or the another network node 113. The third indication may be configured to indicate the paging carrier configured to be indicated.

Other units 1004 may be comprised in the second network node 112.

The embodiments herein in the second network node 112 may be implemented through one or more processors, such as a processor 1005 in the second network node 112 depicted in FIG. 10*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 1006 comprising one or more memory units. The memory 1006 is arranged to be used to store obtained information, store data, configurations, schedulings, and applications etc. to perform the methods herein when being executed in the second network node 112.

In some embodiments, the second network node 112 may receive information from, e.g., the wireless device 130, the first network node 111 and/or the another network node 113 through a receiving port 1007. In some embodiments, the receiving port 1007 may be, for example, connected to one or more antennas in second network node 112. In other embodiments, the second network node 112 may receive information from another structure in the wireless communications network 100 through the receiving port 1007. Since the receiving port 1007 may be in communication with the processor 1005, the receiving port 1007 may then send the received information to the processor 1005. The receiving port 1007 may also be configured to receive other information.

The processor 1005 in the second network node 112 may be further configured to transmit or send information to e.g., the wireless device 130, the first network node 111, the another network node 113, and/or another structure in the wireless communications network 100, through a sending port 1008, which may be in communication with the processor 1005, and the memory 1006.

Those skilled in the art will also appreciate that the different units 1001-1003 described above may refer to a combination of analog and digital modules, and/or one or more processors configured with software and/or firmware, e.g., stored in memory, that, when executed by the one or more processors such as the processor 1005, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1001-1003 described above may be implemented as one or more applications running on one or more processors such as the processor 1005.

Thus, the methods according to the embodiments described herein for the second network node 112 may be respectively implemented by means of a computer program 1009 product, comprising instructions, i.e., software code portions, which, when executed on at least one processor 1005, cause the at least one processor 1005 to carry out the actions described herein, as performed by the second network node 112. The computer program 1009 product may be stored on a computer-readable storage medium 1010. The computer-readable storage medium 1010, having stored thereon the computer program 1009, may comprise instructions which, when executed on at least one processor 1005, cause the at least one processor 1005 to carry out the actions described herein, as performed by the second network node 112. In some embodiments, the computer-readable storage medium 1010 may be a non-transitory computer-readable storage medium, such as a CD ROM disc, or a memory stick. In other embodiments, the computer program 1009 product may be stored on a carrier containing the computer program 1009 just described, wherein the carrier is one of an electronic signal, optical signal, radio signal, or the computer-readable storage medium 1010, as described above.

The second network node 112 may comprise a communication interface configured to facilitate communications between the second network node 112 and other nodes or devices, e.g., the wireless device 130, the first network node 111, the another network node 113, and/or another structure in the wireless communications network 100. The interface may, for example, include a transceiver configured to transmit and receive radio signals over an air interface in accordance with a suitable standard.

In other embodiments, the second network node 112 may comprise the following arrangement depicted in FIG. 10*b*. The second network node 112 may comprise a processing circuitry 1005, e.g., one or more processors such as the processor 1005, in the second network node 112 and the memory 1006. The second network node 112 may also comprise a radio circuitry 1011, which may comprise e.g., the receiving port 1007 and the sending port 1008. The processing circuitry 1005 may be configured to, or operable to, perform the method actions according to FIG. 4 and/or FIG. 7, in a similar manner as that described in relation to FIG. 10*a*. The radio circuitry 1011 may be configured to set up and maintain at least a wireless connection with the wireless device 130, the first network node 111, the another network node 113, and/or another structure in the wireless communications network 100. Circuitry may be understood herein as a hardware component.

Figure 4:
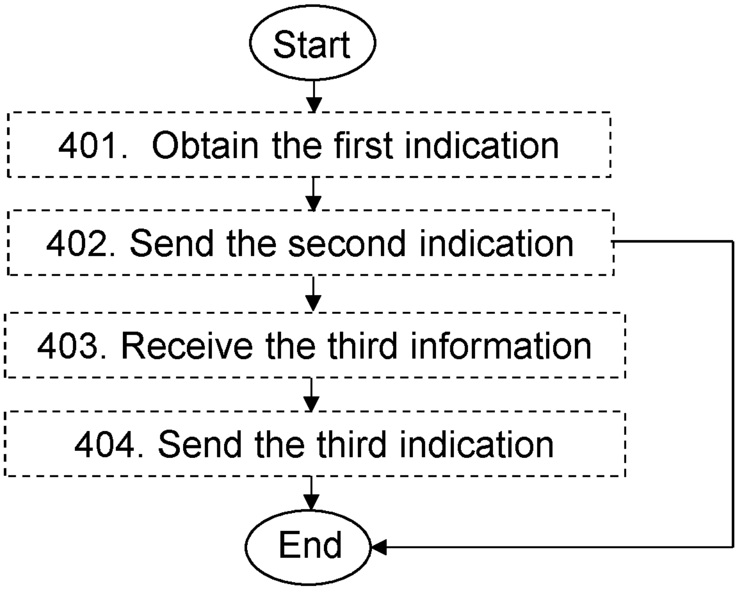
FIG. 4 is a flowchart depicting a method in a second network node, according to embodiments herein.

Hence, embodiments herein also relate to the second network node 112 comprising the processing circuitry 1005 and the memory 1006, said memory 1006 containing instructions executable by said processing circuitry 1005, whereby the second network node 112 is operative to perform the actions described herein in relation to the second network node 112, e.g., in FIG. 4 and/or FIG. 7.

Embodiments herein may be related to NR, NR_Small Data_INACTIVE, SDT, MTC and/or IoT.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

EXAMPLES

Example 1. A method performed by a wireless device (130), the method being for handling a carrier to monitor paging, the wireless device (130) operating in a wireless communications network (100), and the method comprising:
- obtaining (202) first information indicating how to determine a carrier to be used to monitor paging based on a change in coverage due to a change in at least one of: a coverage condition and a cell to camp on, and,
- determining (204) the carrier to monitor paging based on the obtained first information.

Example 2. The method according to example 1, wherein the obtained first information indicates at least one of:
- with the proviso that the wireless device (130) enters idle mode, the wireless device (130) is to use a first carrier assigned as dedicated paging carrier via dedicated signalling, and continue to apply the obtained first information until the wireless device (130) enters connected state next time,
- with the proviso that the wireless device (130) camps on another cell (123), and with the proviso that second information on how to select the carrier to be used for paging is provided, e.g., broadcasted, in the another cell (123), determine the carrier to be used based on the second information;
- with the proviso that; a) the wireless device (130) camps on another cell (123), b) the second information on how to select the carrier to be used for paging is absent, e.g., in broadcasts, in the another cell (123), and c) the first information indicates a fallback configuration, e.g., a second carrier, determine the carrier to be used based on the fallback configuration indicated, e.g., the second carrier, in the first information;
- with the proviso that: a) the wireless device (130) camps on another cell (123), b) the second information on how to select the carrier to be used for paging is absent, e.g., in broadcasts in the another cell (123), and c) the first information lacks an indication of the fallback configuration, e.g., the second carrier, determine the carrier to be used based on a third carrier, e.g., a fixed carrier, such as a carrier derived based on an identifier of the wireless device (130); and
- with the proviso that: a) the wireless device (130) receives the first information in a first cell (121), camps on one or more other cells (122) without being in connected mode, and then re-selects the first cell (121), determine the carrier to be used based on the first information, e.g., based on the first carrier assigned as dedicated paging carrier via dedicated signalling.

Example 3. The method according to example 2, wherein the obtained first information indicates that at least one of:
- with the proviso that a measure of the coverage condition indicates poor coverage with respect to a first threshold, the wireless device (130) is to select a fourth carrier, e.g., an anchor carrier or another carrier different than the dedicated paging carrier, and with the proviso that the measure of the coverage condition indicates good coverage with respect to a second threshold, the wireless device (130) is to select a fifth carrier, e.g., the first carrier, such as the dedicated paging carrier.

Example 4. The method according to any of examples 2-3, wherein at least one of:

the first information is received in dedicated signalling or in broadcasted information, e.g., SIB2-NB or SIB22-NB in the first cell (121), and the second information is received in broadcasted information in the another cell (123).

Example 5. The method according to example 4, wherein at least one of the first information and the second information is received in an information element.

Example 6. The method according to any of examples 1-5, wherein the first information indicates to use one of: an anchor carrier, a fixed carrier, e.g., a carrier derived based on an identifier of the wireless device (130), and a first carrier assigned as dedicated paging carrier via dedicated signalling.

Example 7. The method according to any of examples 1-6, wherein the first information is received from a first network node (111) operating in the wireless communications network (100).

Example 8. The method according to example 7, wherein the further comprising:

sending (201) a first indication to the first network node (111), the first indication indicating a capability of the wireless device (130) to support a change of paging carrier based on a change in coverage due to a change in at least one of: the coverage condition and the cell to camp on, and wherein the obtained first information is based on the sent first indication.

Example 9. The method according to any of examples 1-8, wherein the wireless device (130) has received the first information in a first cell (121), and the wireless device (130) camps on another cell (123), and wherein the method further comprises:

obtaining (203) second information in the another cell (123) indicating how to select the carrier to be used for paging in the another cell (123), and wherein the carrier is further determined based on the obtained second information.

Example 10. The method according to any of examples 1-9, wherein the coverage condition is determined based on a measure of radio coverage, e.g., an error rate in a control channel, estimated by the wireless device (130), e.g., using a maximum number of repetitions, on e.g., the dedicated paging carrier.

Example 11. The method to any of examples 1-10, further comprising:

tuning (205) to the determined carrier to monitor paging.

Example 12. A method performed by a first network node (111), the method being for handling a carrier to monitor paging, the first network node (111) operating in a wireless communications network (100), and the method comprising:

sending (302) first information indicating, to a wireless device (130) operating in the communications network (100), how to determine a carrier to be used to monitor paging based on a change in coverage due to a change, for the wireless device (130), in at least one of: a coverage condition and a cell to camp on.

Example 13. The method according to example 12, wherein the sent first information indicates at least one of:

with the proviso that the wireless device (130) enters idle mode, the wireless device (130) is to use a first carrier assigned as dedicated paging carrier via dedicated signalling, and continue to apply the obtained first information until the wireless device (130) enters connected state next time, with the proviso that the wireless device (130) camps on another cell (123), and with the proviso that second information on how to select the carrier to be used for paging is provided, e.g., broadcasted, in the another cell (123), determine the carrier to be used based on the second information;

with the proviso that; a) the wireless device (130) camps on another cell (123), b) the second information on how to select the carrier to be used for paging is absent, e.g., in broadcasts, in the another cell (123), determine the carrier to be used based on a fallback configuration indicated, e.g., a second carrier, in the first information;

wherein the first information lacks an indication of the fallback configuration, e.g., the second carrier, and with the proviso that: a) the wireless device (130) camps on another cell (123), and b) the second information on how to select the carrier to be used for paging is absent, e.g., in broadcasts in the another cell (123), determine the carrier to be used based on a third carrier, e.g., a fixed carrier, such as a carrier derived based on an identifier of the wireless device (130); and with the proviso that: a) the wireless device (130) receives the first information in a first cell (121), camps on one or more other cells (122) without being in connected mode, and then re-selects the first cell (121), determine the carrier to be used based on the first information, e.g., based on the first carrier assigned as dedicated paging carrier via dedicated signalling.

Example 14. The method according to example 13, wherein the sent first information indicates that at least one of:

with the proviso that a measure of the coverage condition indicates poor coverage with respect to a first threshold, the wireless device (130) is to select a fourth carrier, e.g., an anchor carrier or another carrier different than the dedicated paging carrier, and with the proviso that the measure of the coverage condition indicates good coverage with respect to a second threshold, the wireless device (130) is to select a fifth carrier, e.g., the first carrier, such as the dedicated paging carrier.

Example 15. The method according to any of examples 13-14, wherein at least one of:

the first information is sent in dedicated signalling or in broadcasted information, e.g., SIB2-NB or SIB22-NB in the first cell (121), and the second information is broadcasted information in the another cell (123).

Example 16. The method according to example 15, wherein the first information is sent in an information element.

Example 17. The method according to any of examples 12-16, wherein the first information indicates to use one of: an anchor carrier, a fixed carrier, e.g., a carrier derived based on an identifier of the wireless device (130), and a first carrier assigned as dedicated paging carrier via dedicated signalling.

Example 18. The method according to any of examples 12-17, wherein the first information is sent to the wireless device (130).

Example 19. The method according to example 18, wherein the further comprising:

receiving (301) at least one of: a) a first indication from the wireless device (130) and b) a second indication from a second network node (112) operating in the wireless communications network (100), the first indication or the second indication indicating a capability of the wireless device (130) to support a change of paging carrier based on a change in coverage due to a change in at least one of: the coverage condition and the cell to camp on, and wherein the sent first information is based on the received first indication.

Example 20. The method according to any of examples 12-19, wherein the coverage condition is determined based on a measure of radio coverage, e.g., an error rate in a control channel, estimated by the wireless device (130), e.g., using a maximum number of repetitions, on e.g., the dedicated paging carrier.

Example 21. The method according to any of examples 12-20, wherein the further comprising:

sending (303) third information to a second network node (112) operating in the wireless communications network (100), the third information indicating a paging carrier configured by the first network node (111) to page the wireless device (130) after a connection release.

Example 22. The method according to any of examples 12-21, wherein the further comprising:

receiving (304) a third indication from a second network node (112) operating in the wireless communications network (100), the third indication indicating a paging carrier configured by the first network node (111), or another network node (113), to page the wireless device (130).

Example 23. A method performed by a second network node (112), the method being for handling a carrier to monitor paging, the second network node (112) operating in a wireless communications network (100), and the method comprising:

obtaining (401) a first indication indicating a capability of a wireless device (130) operating in the wireless communications network (100), to support a change of paging carrier based on a change in coverage due to a change in at least one of: the coverage condition and the cell to camp on, and sending (402) a second indication to one of a first network node (111), or another network node (113), the second indication indicating the indicated capability.

Example 24. The method according to example 23, wherein the further comprising:

receiving (403) third information from the first network node (111), or another network node (113), the third information indicating a paging carrier configured by the first network node (111), or the another network node (113), to page the wireless device (130) after a connection release, and sending (404) a third indication to one of the first network node (111) or the another network node (113), the third indication indicating the indicated paging carrier, e.g., a paging carrier to page the wireless device (130).

FURTHER EXTENSIONS AND VARIATIONS

Figure 11:
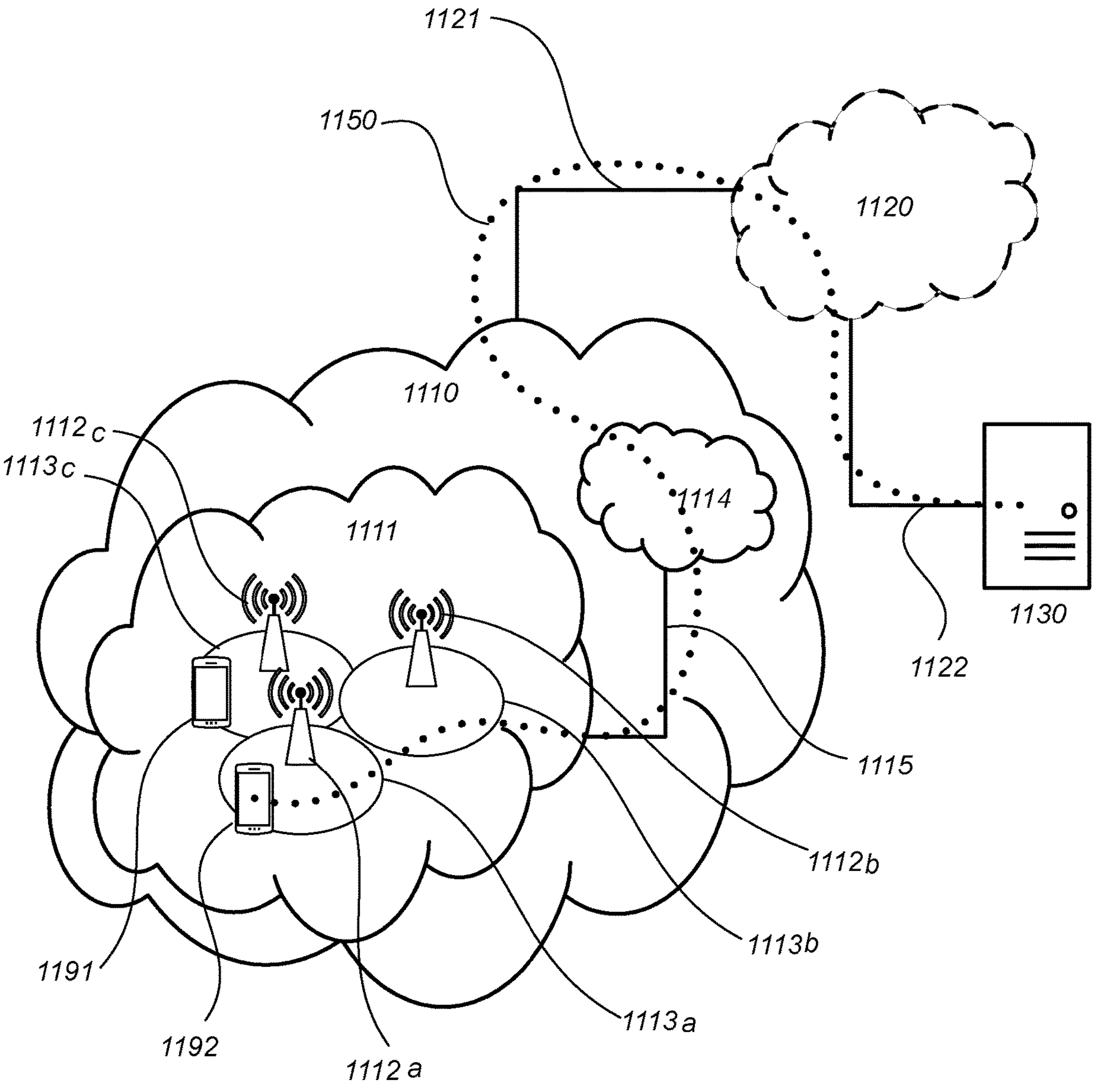
FIG. 11 is a schematic block diagram illustrating a telecommunication network connected via an intermediate network to a host computer, according to embodiments herein.

FIG. 11: Telecommunication network connected via an intermediate network to a host computer in accordance with some embodiments With reference to FIG. 11, in accordance with an embodiment, a communication system includes telecommunication network 1110 such as the wireless communications network 100, for example, a 3GPP-type cellular network, which comprises access network 1111, such as a radio access network, and core network 1114. Access network 1111 comprises a plurality of network nodes such as the first network node 111, and/or the another network node 113. For example, base stations 1112*a*, 1112*b*, 1112*c*, such as NBs, eNBs, gNBs or other types of wireless access points, each defining a corresponding coverage area 1113*a*, 1113*b*, 1113*c*. Each base station 1112*a*, 1112*b*, 1112*c* is connectable to core network 1114 over a wired or wireless connection 1115. A plurality of user equipments, such as the wireless device 130 are comprised in the wireless communications network 100. In FIG. 11, a first UE 1191 located in coverage area 1113*c* is configured to wirelessly connect to, or be paged by, the corresponding base station 1112*c*. A second UE 1192 in coverage area 1113*a* is wirelessly connectable to the corresponding base station 1112*a*. While a plurality of UEs 1191, 1192 are illustrated in this example, the disclosed embodiments are equally applicable to a situation where a sole UE is in the coverage area or where a sole UE is connecting to the corresponding base station 1112. Any of the UEs 1191, 1192 are examples of the wireless device 130.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

In relation to FIGS. 12, 13, 14, 15, and 16, which are described next, it may be understood that a UE is an example of the wireless device 130, and that any description provided for the UE equally applies to the wireless device 130. It may be also understood that the base station is an example of the first network node 111, and/or the another network node 113, and that any description provided for the base station equally applies to the first network node 111, and/or the another network node 113.

Figure 12:
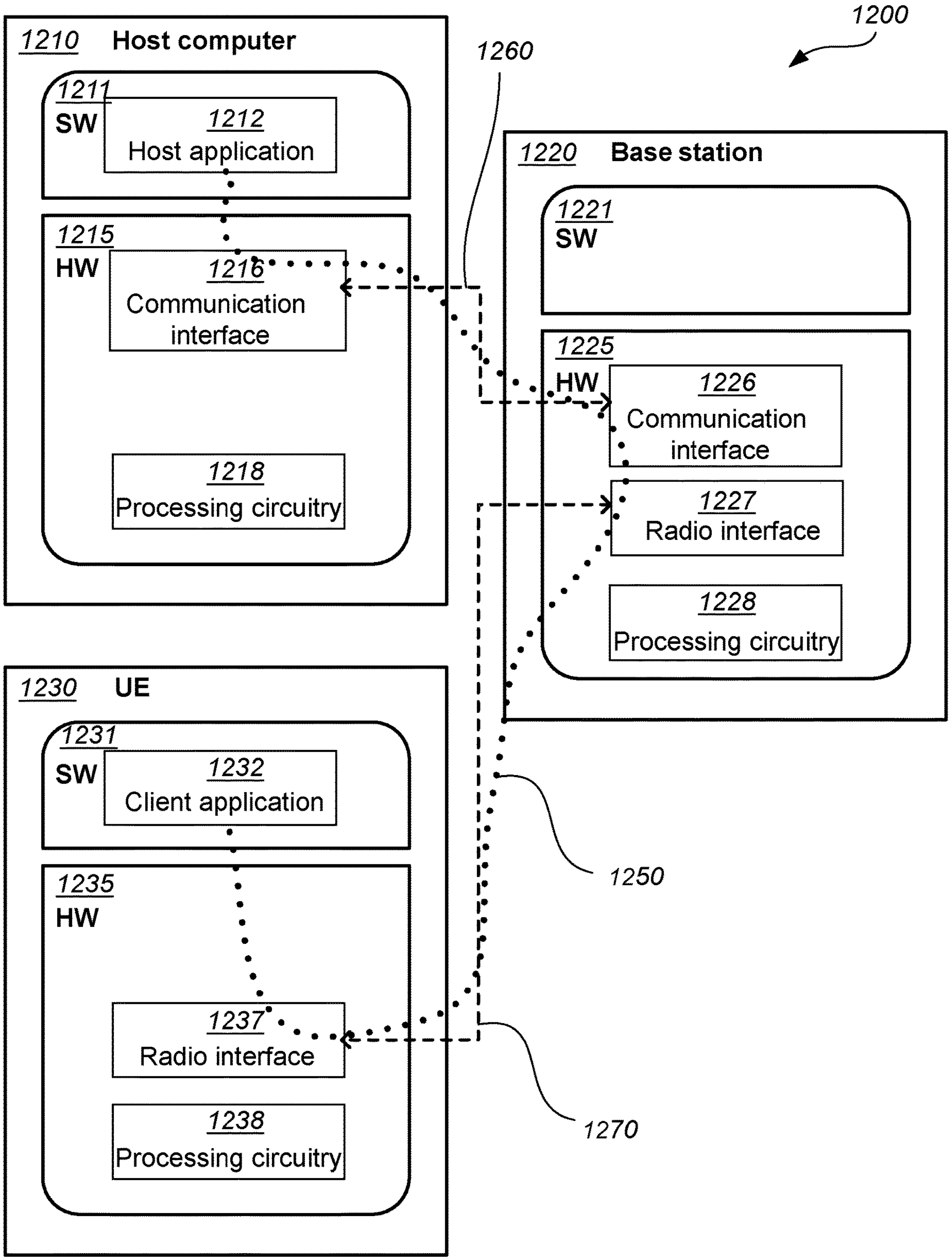
FIG. 12 is a generalized block diagram of a host computer communicating via a base station with a user equipment over a partially wireless connection, according to embodiments herein.

FIG. 12: Host Computer Communicating Via a Base Station With a User Equipment Over a Partially Wireless Connection in Accordance With Some Embodiments Example implementations, in accordance with an embodiment, of the wireless device 130, e.g., a UE, the first network node 111, and/or the another network node 113, e.g., a base station and host computer discussed in the preceding paragraphs will now be described with reference to FIG. 12. In communication system 1200, such as the wireless communications network 100, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes the first network node 111, and/or the another network node 113, exemplified in FIG. 12 as a base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with the wireless device 130, exemplified in FIG. 12 as a UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 12 may be similar or identical to host computer 1130, one of base stations 1112*a*, 1112*b*, 1112*c* and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

The wireless device 130 embodiments relate to FIG. 2, FIG. 5, FIG. 8 and FIGS. 11-16.

The wireless device 130 may also be configured to communicate user data with a host application unit in a host computer 1210, e.g., via another link such as 1260.

The wireless device 130 may comprise an interface unit to facilitate communications between the wireless device 130 and other nodes or devices, e.g., the first network node 111, the second network node 112, the another network node 113, the host computer 1210, or any of the other nodes. In some particular examples, the interface may, for example, include a transceiver configured to transmit and receive radio signals over an air interface in accordance with a suitable standard.

The wireless device 130 may comprise an arrangement as shown in FIG. 8 or in FIG. 12.

The first network node 111 embodiments relate to FIG. 3, FIG. 6, FIG. 9 and FIGS. 11-16.

The first network node 111 may also be configured to communicate user data with a host application unit in a host computer 1210, e.g., via another link such as 1260.

The first network node 111 may comprise an interface unit to facilitate communications between the first network node 111 and other nodes or devices, e.g., the wireless device 130, the host computer 1210, or any of the other nodes. In some particular examples, the interface may, for example, include a transceiver configured to transmit and receive radio signals over an air interface in accordance with a suitable standard.

The first network node 111 may comprise an arrangement as shown in FIG. 9 or in FIG. 12.

The second network node 112 embodiments relate to FIG. 4, FIG. 7, FIG. 10 and FIGS. 11-16.

The second network node 112 may also be configured to communicate user data with a host application unit in a host computer 1210, e.g., via another link such as 1260.

The second network node 112 may comprise an interface unit to facilitate communications between the second network node 112 and other nodes or devices, e.g., the wireless device 130, the host computer 1210, or any of the other nodes. In some particular examples, the interface may, for example, include a transceiver configured to transmit and receive radio signals over an air interface in accordance with a suitable standard.

The second network node 112 may comprise an arrangement as shown in FIG. 10 or in FIG. 12.

Figure 13:
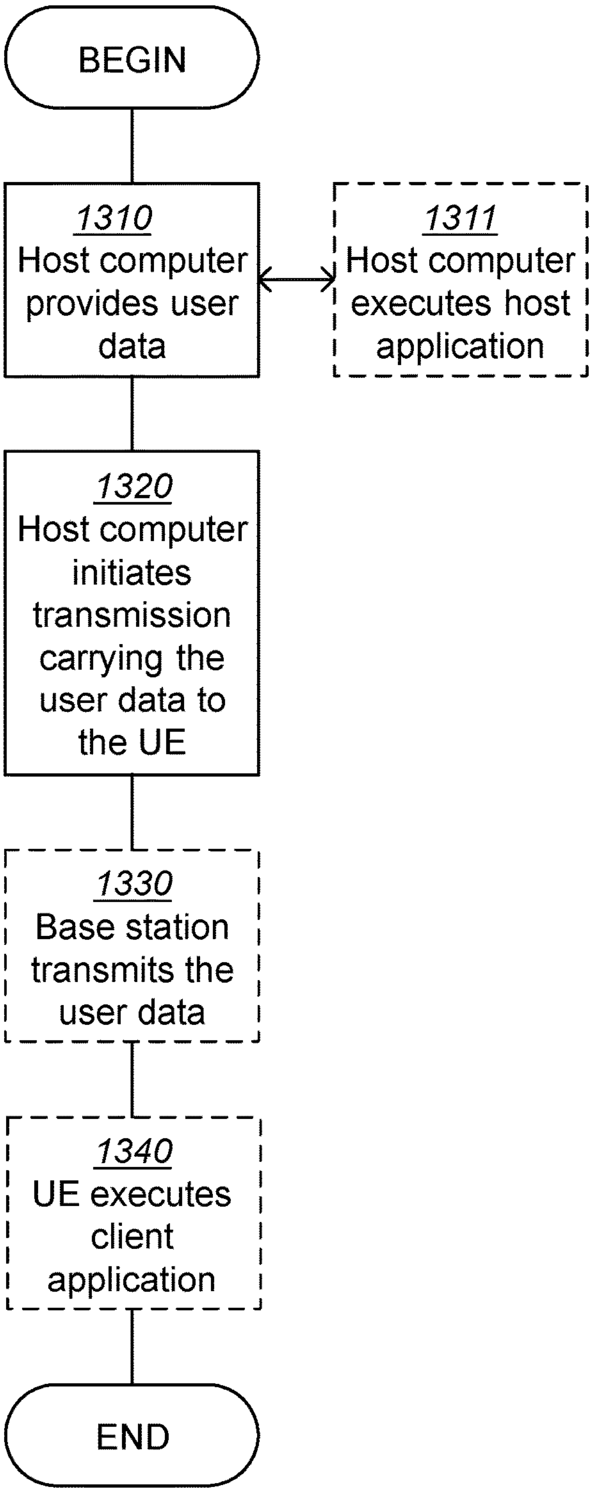
FIG. 13 is a flowchart depicting embodiments of a method in a communications system including a host computer, a base station and a user equipment, according to embodiments herein.

FIG. 13: Methods Implemented in a Communication System Including a Host Computer, a Base Station and a User Equipment in Accordance With Some Embodiments FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
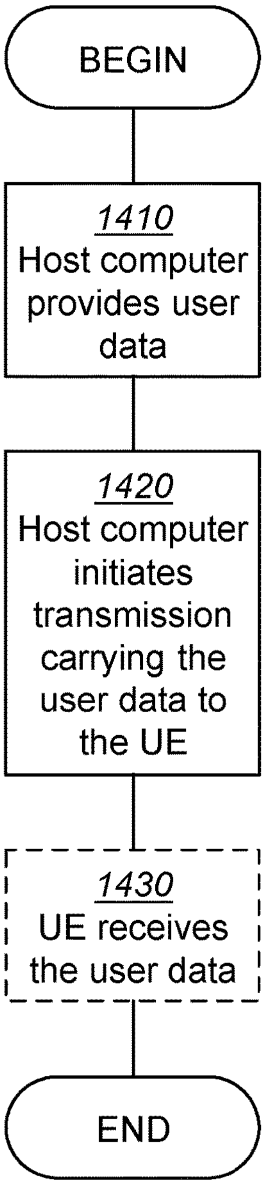
FIG. 14 is a flowchart depicting embodiments of a method in a communications system including a host computer, a base station and a user equipment, according to embodiments herein.

FIG. 14: Methods Implemented in a Communication System Including a Host Computer, a Base Station and a User Equipment in Accordance With Some Embodiments FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
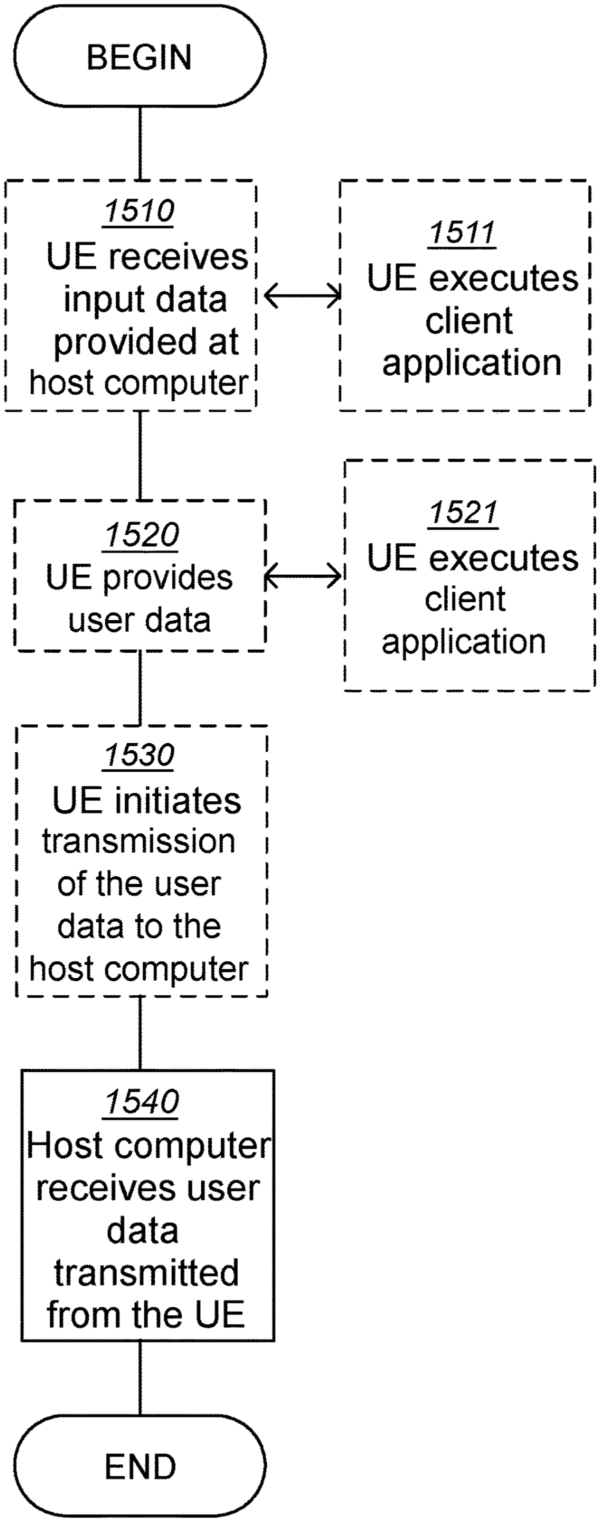
FIG. 15 is a flowchart depicting embodiments of a method in a communications system including a host computer, a base station and a user equipment, according to embodiments herein.

FIG. 15: Methods Implemented in a Communication System Including a Host Computer, a Base Station and a User Equipment in Accordance With Some Embodiments FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

Figure 16:
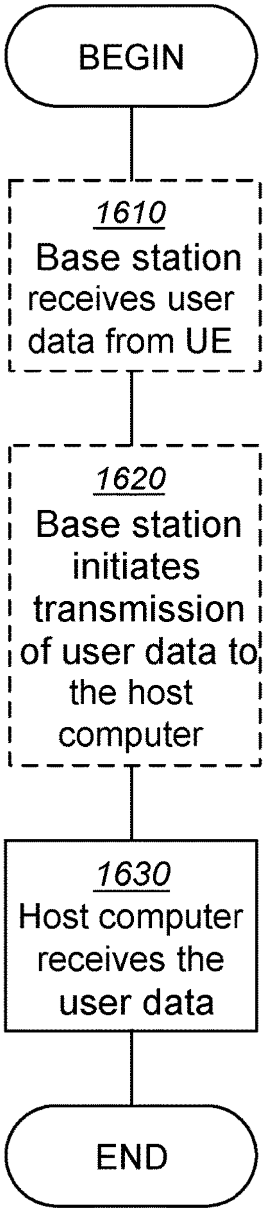
FIG. 16 is a flowchart depicting embodiments of a method in a communications system including a host computer, a base station and a user equipment, according to embodiments herein.

FIG. 16: Methods Implemented in a Communication System Including a Host Computer, a Base Station and a User Equipment in Accordance With Some Embodiments FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FURTHER NUMBERED EMBODIMENTS

1. A base station configured to communicate with a user equipment (UE), the base station comprising a radio interface and processing circuitry configured to perform one or more of the actions described herein as performed by the first network node 111, and/or the another network node 113.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by the first network node 111, and/or the another network node 113.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising one or more of the actions described herein as performed by the first network node 111, and/or the another network node 113.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by the first network node 111, and/or the another network node 113.

16. The method of embodiment 15, further comprising:
   at the base station, transmitting the user data.

17. The method of embodiment 16, wherein the user data is provided at the host computer by executing a host application, the method further comprising:
   at the UE, executing a client application associated with the host application.

21. A user equipment (UE) configured to communicate with a base station, the UE comprising a radio interface and processing circuitry configured to perform one or more of the actions described herein as performed by the wireless device 130.

25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the wireless device 130.

26. The communication system of embodiment 25, further including the UE.

27. The communication system of embodiment 26, wherein the cellular network further includes a base station configured to communicate with the UE.

28. The communication system of embodiment 26 or 27, wherein:
   the processing circuitry of the host computer is configured to execute a host application, thereby providing the user data; and
   the UE's processing circuitry is configured to execute a client application associated with the host application.

31. A method implemented in a user equipment (UE), comprising one or more of the actions described herein as performed by the wireless device 130.

35. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs one or more of the actions described herein as performed by the wireless device 130.

36. The method of embodiment 35, further comprising:

at the UE, receiving the user data from the base station.

41. A user equipment (UE) configured to communicate with a base station, the UE comprising a radio interface and processing circuitry configured to perform one or more of the actions described herein as performed by the wireless device 130.

45. A communication system including a host computer comprising:

a communication interface configured to receive user data originating from a transmission from a user equipment (UE) to a base station, wherein the UE comprises a radio interface and processing circuitry, the UE's processing circuitry configured to: perform one or more of the actions described herein as performed by the wireless device 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:

the processing circuitry of the host computer is configured to execute a host application; and the UE's processing circuitry is configured to execute a client application associated with the host application, thereby providing the user data.

49. The communication system of embodiment 46 or 47, wherein:

the processing circuitry of the host computer is configured to execute a host application, thereby providing request data; and the UE's processing circuitry is configured to execute a client application associated with the host application, thereby providing the user data in response to the request data.

51. A method implemented in a user equipment (UE), comprising one or more of the actions described herein as performed by the wireless device 130.

52. The method of embodiment 51, further comprising:

providing user data; and forwarding the user data to a host computer via the transmission to the base station.

55. A method implemented in a communication system including a host computer, a base station and a user equipment (UE), the method comprising:

at the host computer, receiving user data transmitted to the base station from the UE, wherein the UE performs one or more of the actions described herein as performed by the wireless device 130.

56. The method of embodiment 55, further comprising:

at the UE, providing the user data to the base station.

57. The method of embodiment 56, further comprising:

at the UE, executing a client application, thereby providing the user data to be transmitted; and at the host computer, executing a host application associated with the client application.

58. The method of embodiment 56, further comprising:

at the UE, executing a client application; and at the UE, receiving input data to the client application, the input data being provided at the host computer by executing a host application associated with the client application, wherein the user data to be transmitted is provided by the client application in response to the input data.

61. A base station configured to communicate with a user equipment (UE), the base station comprising a radio interface and processing circuitry configured to perform one or more of the actions described herein as performed by the first network node 111, and/or the another network node 113.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the first network node 111, and/or the another network node 113.

66. The communication system of embodiment 65, further including the base station.

67. The communication system of embodiment 66, further including the UE, wherein the UE is configured to communicate with the base station.

68. The communication system of embodiment 67, wherein:

the processing circuitry of the host computer is configured to execute a host application;

the UE is configured to execute a client application associated with the host application, thereby providing the user data to be received by the host computer.

71. A method implemented in a base station, comprising one or more of the actions described herein as performed by the first network node 111, and/or the another network node 113.

75. A method implemented in a communication system including a host computer, a base station and a user equipment (UE), the method comprising:

at the host computer, receiving, from the base station, user data originating from a transmission which the base station has received from the UE, wherein the UE performs one or more of the actions described herein as performed by the wireless device 130.

76. The method of embodiment 75, further comprising:

at the base station, receiving the user data from the UE.

77. The method of embodiment 76, further comprising:

at the base station, initiating a transmission of the received user data to the host computer.

The invention claimed is:

1. A method performed by a wireless device, the method being for handling a carrier to monitor paging, the wireless device operating in a wireless communications network, and the method comprising:

obtaining, from a first base station while in a first cell, first information indicating how the wireless device is to select a carrier to be used to monitor paging based on a change in coverage due to a change in at least one of: a coverage condition and a cell to camp on, wherein the obtained first information indicates at least two of:

a second proviso that responsive to: a) the wireless device camping on another cell, b) second information on how to select the carrier to be used for paging is absent in the another cell, and c) the first information indicating a fallback configuration, the wireless device is to select the carrier to be used based on the fallback configuration indicated in the first information, a third proviso that responsive to: a) the wireless device camping on the another cell, b) the second information on how to select the carrier to be used for paging is absent in the another cell, and c) the first information lacks an indication of the fallback configuration, the wireless device is to select the carrier to be used based on a third carrier including a carrier derived based on an identifier of the wireless device, and a fourth proviso that responsive to: a) the wireless device receiving the first information in the first cell, b) the wireless device camping on one or more other cells without being in connected mode, and c) the wireless device re-selecting the first cell, the wireless device is to select the carrier to be used based on the first information;

determining which of the at least two provisos from the obtained first information is satisfied;

responsive to the second proviso being satisfied, selecting the carrier based on the fallback configuration indicated in the first information;

responsive to the third proviso being satisfied, selecting the carrier based on the third carrier including the carrier derived based on the identifier of the wireless device;

responsive to the fourth proviso being satisfied, selecting the carrier based on the first information; and tuning to the selected carrier to monitor paging from the first base station.

2. The method according to claim 1, wherein the obtained first information further indicates:

a fifth proviso that responsive to the wireless device entering idle mode, the wireless device is to select a first carrier assigned as dedicated paging carrier via dedicated signaling and continue to apply the obtained first information until the wireless device enters connected state next time.

3. The method according to claim 1, wherein the obtained first information further indicates that at least one of:

a sixth proviso that responsive to a measure of the coverage condition indicating poor coverage with respect to a first threshold, the wireless device is to select a fourth carrier, and a seventh proviso that responsive to the measure of the coverage condition indicating good coverage with respect to a second threshold, the wireless device is to select a fifth carrier.

4. The method according to claim 1, wherein at least one of:

the first information is received in dedicated signaling or in broadcasted information in the first cell, and the second information is received in broadcasted information in the another cell.

5. The method according to claim 4, wherein at least one of the first information and the second information is received in an information element.

6. The method according to claim 1, wherein the first information indicates to the wireless device to select one of: an anchor carrier, a fixed carrier, and a first carrier assigned as dedicated paging carrier via dedicated signaling.

7. The method according to claim 1, wherein the first information is received from a first base station operating in the wireless communications network.

8. The method according to claim 7, the method further comprising:

sending a first indication to the first base station, the first indication indicating a capability of the wireless device to support a change of paging carrier based on a change in coverage due to a change in at least one of: the coverage condition and the cell to camp on, and wherein the obtained first information is based on the sent first indication.

9. The method according to claim 1, wherein the wireless device has received the first information in a first cell, and the wireless device camps on another cell, and wherein the method further comprises:

obtaining second information in the another cell indicating how to select the carrier to be used for paging in the another cell, and wherein the carrier is further selected based on the obtained second information.

10. The method according to claim 1, wherein the coverage condition is determined based on a measure of radio coverage estimated by the wireless device.

11. A method performed by a first base station, the method being for handling a carrier to monitor paging, the first base station operating in a wireless communications network, and the method comprising:

generating a message comprising first information indicating, to a wireless device operating in a first cell of the wireless communications network, how to select a carrier to be used to monitor paging based on a change in coverage due to a change, for the wireless device, in at least one of: a coverage condition and a cell to camp on, wherein the first information indicates at least two of:

a second proviso that responsive to: a) the wireless device camping on another cell, b) second information on how to select the carrier to be used for paging is absent in the another cell, and c) the first information indicating a fallback configuration, the wireless device is to select the carrier to be used based on the fallback configuration indicated in the first information;

a third proviso that responsive to: a) the wireless device camping on the another cell, b) the second information on how to select the carrier to be used for paging is absent in the another cell, and c) the first information lacks an indication of the fallback configuration, the wireless device is to select the carrier to be used based on a third carrier including a carrier derived based on an identifier of the wireless device; and a fourth proviso that responsive to: a) the wireless device receiving the first information in the first cell, b) the wireless device camping on one or more other cells without being in connected mode, and c) the wireless device re-selecting the first cell, the wireless device is to select the carrier to be used based on the first information; and sending the message comprising the first information to the wireless device; and paging the wireless device on a carrier the wireless device is tuned to.

12. The method according to claim 11, wherein the sent first information further indicates:

a fifth proviso that responsive to the wireless device entering idle mode, the wireless device is to select a first carrier assigned as dedicated paging carrier via dedicated signaling and continue to apply the obtained first information until the wireless device enters connected state next time.

13. The method according to claim 11, wherein the sent first information further indicates that:

a sixth proviso that responsive to a measure of the coverage condition indicating poor coverage with respect to a first threshold, the wireless device is to select a fourth carrier, and a seventh proviso that responsive to the measure of the coverage condition indicating good coverage with respect to a second threshold, the wireless device is to select a fifth carrier.

14. The method according to claim 11, wherein at least one of:

the first information is sent in dedicated signaling or in broadcasted information in the first cell, and the second information is broadcasted information in the another cell.

15. The method according to claim 14, wherein the first information is sent in an information element.

16. The method according to claim 11, wherein the first information indicates to the wireless device to select one of: an anchor carrier, a fixed carrier, and a first carrier assigned as dedicated paging carrier via dedicated signaling.

17. The method according to claim 11, wherein the first information is sent to the wireless device.

18. The method according to claim 17, further comprising:

receiving at least one of: a) a first indication from the wireless device and b) a second indication from a second base station operating in the wireless communications network, the first indication or the second indication indicating a capability of the wireless device to support a change of paging carrier based on a change in coverage due to a change in at least one of: the coverage condition and the cell to camp on, and wherein the sent first information is based on the received first indication.

19. The method according to claim 11, wherein the coverage condition is determined based on a measure of radio coverage estimated by the wireless device.

20. The method according to claim 11, further comprising:

sending third information to a second base station operating in the wireless communications network, the third information indicating a paging carrier configured by the first base station to page the wireless device after a connection release.

21. The method according to claim 11, further comprising:

receiving a third indication from a second base station operating in the wireless communications network, the third indication indicating a paging carrier configured by the first base station, or another base station, to page the wireless device.

22. A wireless device, the wireless device being for handling a carrier to monitor paging, the wireless device being configured to operate in a wireless communications network, and the wireless device being further configured to:

obtain, from a first base station while in a first cell, first information configured to indicate how the wireless device is to select a carrier configured to be used to monitor paging based on a change in coverage due to a change in at least one of: a coverage condition and a cell to camp on, wherein the obtained first information indicates at least two of:

a second proviso that responsive to: a) the wireless device camping on another cell, b) second information on how to select the carrier to be used for paging is absent in the another cell, and c) the first information indicating a fallback configuration, the wireless device is to select the carrier to be used based on the fallback configuration indicated in the first information, a third proviso that responsive to: a) the wireless device camping on the another cell, b) the second information on how to select the carrier to be used for paging is absent in the another cell, and c) the first information lacks an indication of the fallback configuration, the wireless device is to select the carrier to be used based on a third carrier including a carrier derived based on an identifier of the wireless device, and a fourth proviso that responsive to: a) the wireless device receiving the first information in the first cell, b) the wireless device camping on one or more other cells without being in connected mode, and c) the wireless device re-selecting the first cell, the wireless device is to select the carrier to be used based on the first information;

determine which of the at least two provisos from the obtained first information is satisfied;

responsive to the second proviso being satisfied, select the carrier based on the fallback configuration indicated in the first information;

responsive to the third proviso being satisfied, select the carrier based on based on the third carrier including the carrier derived based on the identifier of the wireless device;

responsive to the fourth proviso being satisfied, select the carrier based on the first information; and tune to the selected carrier to monitor paging from the first base station.

23. The wireless device according to claim 22, wherein the first information configured to be obtained is configured to further indicate:

a fifth proviso that responsive to the wireless device entering idle mode, the wireless device is to select a first carrier configured to be assigned as dedicated paging carrier via dedicated signaling and continue to apply the first information configured to be obtained until the wireless device enters connected state next time.

* * * * *